United States Patent
Ozturk et al.

(10) Patent No.: US 9,722,731 B2
(45) Date of Patent: *Aug. 1, 2017

(54) TECHNIQUES FOR AGGREGATING DATA FROM WWAN AND WLAN

(71) Applicant: QUALCOMM Incorporated, San Diego, CA (US)

(72) Inventors: Ozcan Ozturk, San Diego, CA (US); Gavin Bernard Horn, La Jolla, CA (US); Madhavan Srinivasan Vajapeyam, San Diego, CA (US); Jelena Damnjanovic, Del Mar, CA (US); Yongbin Wei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/405,598

(22) Filed: Jan. 13, 2017

(65) Prior Publication Data

US 2017/0134123 A1 May 11, 2017

Related U.S. Application Data

(63) Continuation of application No. 14/455,326, filed on Aug. 8, 2014, now Pat. No. 9,585,048.

(Continued)

(51) Int. Cl.
*H04W 24/10* (2009.01)
*H04W 84/12* (2009.01)
(Continued)

(52) U.S. Cl.
CPC ............ *H04L 1/1628* (2013.01); *H04L 47/41* (2013.01); *H04W 24/10* (2013.01); *H04W 80/02* (2013.01);
(Continued)

(58) Field of Classification Search
CPC ....... H04L 1/1685; H04L 47/41; H04L 47/34; H04L 49/9057; H04W 28/0205; H04W 88/06; H04W 88/10; H04W 80/02
See application file for complete search history.

(56) References Cited

U.S. PATENT DOCUMENTS 8,989,004 B2  3/2015  Zhang et al.
2009/0034476 A1  2/2009  Wang et al.
(Continued)

FOREIGN PATENT DOCUMENTS

WO   WO-2012/064772 A1   5/2012

OTHER PUBLICATIONS

International Search Report and Written Opinion—PCT/US2014/062436—ISA/EPO—Feb. 2, 2015. 13 pages.

*Primary Examiner* — Gbemileke J Onamuti
(74) *Attorney, Agent, or Firm* — Arent Fox, LLP

(57) ABSTRACT

Certain aspects of the present disclosure relate to techniques for aggregating data from a wireless wide area network (WWAN) and wireless local area network (WLAN). In some aspects, a packet convergence entity (e.g., PDCP layer entity) communicates with first and second radio access technology (RAT) links. The packet convergence entity may determine from which of the first and second RAT links a data packet is received and may monitor a sequence number value of each of the received data packets. The packet convergence entity may perform one or more actions based on a determination that one or more packets are missing based on the monitored sequence number values. The packet convergence entity may send a status report in response to one or more events on one or both of the first RAT link and the second RAT link.

34 Claims, 17 Drawing Sheets

Related U.S. Application Data

(60) Provisional application No. 61/897,665, filed on Oct. 30, 2013.

(51) Int. Cl.

| | | |
|---|---|---|
| *H04W 24/02* | (2009.01) | |
| *H04L 1/16* | (2006.01) | |
| *H04L 12/891* | (2013.01) | |
| H04W 84/04 | (2009.01) | |
| H04W 88/10 | (2009.01) | |
| H04W 80/02 | (2009.01) | |

(52) U.S. Cl.
CPC .......... *H04W 84/042* (2013.01); *H04W 84/12* (2013.01); *H04W 88/10* (2013.01)

(56) References Cited

U.S. PATENT DOCUMENTS

| | | |
|---|---|---|
| 2009/0161545 A1 | 6/2009 | Ho et al. |
| 2012/0082096 A1 | 4/2012 | Cave et al. |
| 2013/0279335 A1 | 10/2013 | Ahmadi |
| 2013/0329694 A1 | 12/2013 | Vrzic et al. |
| 2015/0117357 A1 | 4/2015 | Ozturk et al. |

TECHNIQUES FOR AGGREGATING DATA FROM WWAN AND WLAN

CLAIM OF PRIORITY UNDER 35 U.S.C. §119

The present Application for Patent is a Continuation of U.S. patent application Ser. No. 14/455,326 entitled "Techniques for Aggregating Data from WWAN and WLAN" filed on Aug. 8, 2014, which claims priority to U.S. Provisional Application No. 61/897,665 entitled "Techniques for Aggregating Data from WWAN and WLAN" filed Oct. 30, 2013, assigned to the assignee hereof and hereby expressly incorporated by reference.

FIELD OF THE DISCLOSURE

Aspects of the present disclosure relate generally to wireless communications, and more particularly, to techniques for aggregating data from a wireless wide area network (WWAN) and a wireless local area network (WLAN).

BACKGROUND OF THE DISCLOSURE

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations (e.g., eNodeBs) that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

The wireless communications with a UE or a network device (e.g., base station, eNodeB) may take place over two separate radio access technologies (RATs) links, where the first RAT link may correspond to a WWAN RAT (e.g., Long Term Evolution (LTE)) and the second RAT link may correspond to a WLAN RAT (e.g., Wi-Fi). The connections to the RATs (e.g., links) are likely to have different properties in terms of data packet errors and delivery of the data packets to an entity at a receiving device that provides convergence for the data packets from the different RATs. In such a scenario, transmitting data (e.g., packet data units (PDUs)) over the two RAT links and aggregating the data at a packet convergence entity at the receiving device may pose challenges, particularly when the packet convergence entity receiving the data assumes that the data packet deliveries are in-order delivery but does not provide reliability support. Therefore, improving data packet handling at a packet convergence entity in a receiving device may reduce the impact on performance when data packets to be aggregated are received out of order.

In view of the foregoing, it may be understood that there may be significant problems and shortcomings associated with current data aggregation technology.

SUMMARY OF THE DISCLOSURE

Aspects of the present disclosure relate generally to wireless communications, and more particularly, to techniques for aggregating data from a WWAN and a WLAN. In one example, the techniques described herein may include aggregation of data at a packet data convergence protocol (PDCP) entity, where the data is received by the PDCP entity over a WWAN and a WLAN.

In accordance with an aspect, a method is described for aggregating data in wireless communications in which a packet convergence entity communicates data packets with a first RAT link and a second RAT link, determines whether each of the data packets is received from the first RAT link and the second RAT link, monitors a sequence number value of each of the data packets received on the first RAT link and the second RAT link, determines whether the SN values of the data packets received on the first RAT link and the second RAT link are out of order, performs one or more actions based on the determination that the sequence number values of the received data packets are out of order, and exchanges packet status information in response to one or more events on one or both of the first RAT link and the second RAT link.

In accordance with another aspect, an apparatus is described for aggregating data in wireless communications that may include means for communicating data packets, by a packet convergence entity, with a first RAT link and a second RAT link, means for determining whether each of the data packets is received from the first RAT link and the second RAT link, means for monitoring a sequence number value of each of the data packets received on the first RAT link and the second RAT link, means for determining whether the sequence number values of the data packets received on the first RAT link and the second RAT link are out of order, means for performing one or more actions based at least in part on the determination that the sequence number values of the received data packets are out of order, and means for exchanging packet status information in response to one or more events on one or both of the first RAT link and the second RAT link In accordance with yet another aspect, a network device is described for aggregating data for aggregating data in wireless communications that may include a receiver component configured to communicate data packets, by a packet convergence entity, with a first radio access technology (RAT) link and a second RAT link, an identifier component configured to determine whether each of the data packets is received from the first RAT link and the second RAT link, a monitoring component configured to monitor a sequence number value of each of the data packets received on the first RAT link and the second RAT link and further configured to determine whether the sequence number values of the data packets received on the first RAT link and the second RAT link are out of order, a reordering component configured to perform one or more actions based at least in part on the determination that the sequence number values of the received data packets are out of order, and a status component configured to exchange packet status information in response to one or more events on one or both of first RAT link and the second RAT link.

The sequence number value (or SN value) assigned to a data packet may be a non-negative integer incremented by one at the source of each new data packet. The packet convergence entity may also assign a separate in-order sequence number for each RAT link. The first RAT link may comprise a WWAN link (e.g., cellular link), the second RAT link may comprise a WLAN link, and the packet convergence entity may comprise a PDCP entity. The WWAN link may comprise an LTE link or Universal Mobile Telecommunication System (UMTS) link, and the WLAN link may comprise a Wi-Fi link.

In accordance with another aspect, a method is described for aggregating data in wireless communications in which data packets are transmitted to a wireless communications device through a first RAT link and a second RAT link, where each of the data packets has an assigned sequence number value for packet aggregation at a packet convergence entity within the wireless communications device. Flow control may be performed over the first and second RAT links, where the flow control is configured to prevent one or both of underflow and overflow of buffers for each of the first and second RAT links. The first RAT link may comprise a WWAN link, the second RAT link may comprise a WLAN link, and the packet convergence entity may comprise a PDCP entity. The WWAN link may comprise a cellular link such as an LTE or UMTS link, and the WLAN link may comprise a Wi-Fi link.

Various aspects and features of the disclosure are described in further detail below with reference to various examples thereof as shown in the accompanying drawings. While the present disclosure is described below with reference to various examples, it should be understood that the present disclosure is not limited thereto. Those of ordinary skill in the art having access to the teachings herein will recognize additional implementations, modifications, and examples, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION

Figure 1:
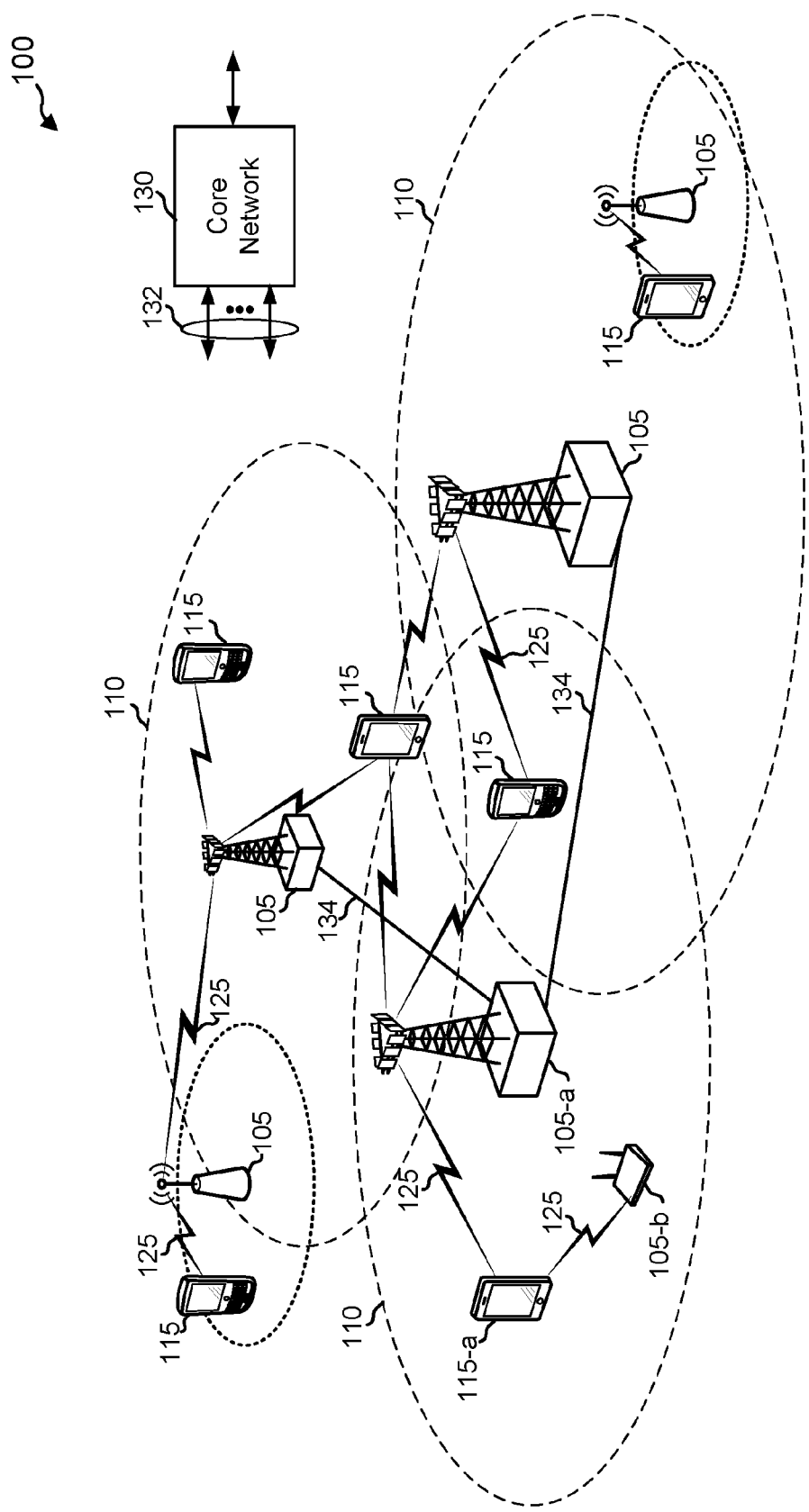
FIG. 1 is a block diagram conceptually illustrating an example of a wireless communications system, in accordance with an aspect of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Various methods, apparatuses, devices, and systems are described for aggregation of WWAN and WLAN data at a packet convergence entity. In some aspects, a packet convergence entity (e.g., PDCP layer) receives data packets (e.g., PDUs) from a first RAT link (e.g., WWAN link) and a second RAT link (e.g., WLAN link). The packet convergence entity may determine or identify from which of the first and second RAT links each data packet is received and may monitor a sequence number value of each of the data packets based at least in part on their respective RAT link. The packet convergence entity may perform one or more actions when the sequence number values of the data packets are received out of order. The one or more actions may include various operations for reordering, aggregating, and/or buffering the data packets. These operations may also include the use of reordering timers and/or reordering buffers. In one example, the packet convergence entity may deliver or send the data packets to an upper layer entity (e.g., Internet Protocol (IP) layer) in the manner in which the data packets are received (e.g., in order or out of order). The packet convergence entity may also reorder the data packets and ignore data packet losses before sending the data packets to the upper layer entity. Moreover, the packet convergence entity may request retransmissions of missing (e.g., lost or not received) data packets on either of the first and second RAT links.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of UMTS. 3GPP LTE and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

FIG. 1 is a block diagram conceptually illustrating an example of a wireless communications system 100, in accordance with an aspect of the present disclosure. The wireless communications system 100 includes base stations (or cells) 105, user equipment (UEs) 115, and a core network 130. The base stations 105 may communicate with the UEs 115 under the control of a base station controller (not shown), which may be part of the core network 130 or the base stations 105 in various embodiments. The base stations 105 may communicate control information and/or user data with the core network 130 through first backhaul links 132. In some aspects, the base stations 105 may communicate, either directly or indirectly, with each other over second backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc. The wireless communications system 100 may also support operation on multiple flows at the same time (e.g., WWANs or cellular, and WLANs or Wi-Fi).

The base stations 105 may wirelessly communicate with the UEs 115 via one or more base station antennas. Each of the base stations 105 sites may provide communication coverage for a respective geographic coverage area 110. In some aspects, base stations 105 may be referred to as a base transceiver station, a radio base station, an access point, a radio transceiver, a basic service set (BSS), an extended service set (ESS), a NodeB, eNodeB, Home NodeB, a Home eNodeB, a cell, or some other suitable terminology. The geographic coverage area 110 for a base station 105 may be divided into sectors making up only a portion of the coverage area (not shown). The wireless communications system 100 may include base stations 105 of different types (e.g., macro, micro, and/or pico base stations). There may be overlapping coverage areas for different technologies.

In implementations, the wireless communications system 100 is an LTE/LTE-A network communication system. In LTE/LTE-A network communication systems, the terms evolved Node B (eNodeB) may be generally used to describe the base stations 105. The wireless communications system 100 may be a Heterogeneous LTE/LTE-A network in which different types of eNodeBs provide coverage for various geographical regions. For example, each eNodeB 105 may provide communication coverage for a macro cell, a pico cell, a femto cell, and/or other types of cell. A macro cell generally covers a relatively large geographic area (e.g., several kilometers in radius) and may allow unrestricted access by UEs 115 with service subscriptions with the network provider. A pico cell would generally cover a relatively smaller geographic area (e.g., buildings) and may allow unrestricted access by UEs 115 with service subscriptions with the network provider. A femto cell would also generally cover a relatively small geographic area (e.g., a home) and, in addition to unrestricted access, may also provide restricted access by UEs 115 having an association with the femto cell (e.g., UEs 115 in a closed subscriber group (CSG), UEs 115 for users in the home, and the like). An eNodeB 105 for a macro cell may be referred to as a macro eNodeB. An eNodeB 105 for a pico cell may be referred to as a pico eNodeB. And, an eNodeB 105 for a femto cell may be referred to as a femto eNodeB or a home eNodeB. An eNodeB 105 may support one or multiple (e.g., two, three, four, and the like) cells. The wireless communications system 100 may support use of LTE and WLAN or Wi-Fi by one or more of the UEs 115.

The core network 130 may communicate with the eNodeBs 105 or other base stations 105 via first backhaul links 132 (e.g., S1 interface, etc.). The eNodeBs 105 may also communicate with one another, e.g., directly or indirectly via second backhaul links 134 (e.g., X2 interface, etc.) and/or via the first backhaul links 132 (e.g., through core network 130). The wireless communications system 100 may support synchronous or asynchronous operation. For synchronous operation, the eNodeBs 105 may have similar frame timing, and transmissions from different eNodeBs 105 may be approximately aligned in time. For asynchronous operation, the eNodeBs 105 may have different frame timing, and transmissions from different eNodeBs 105 may not be aligned in time. The techniques described herein may be used for either synchronous or asynchronous operations.

The UEs 115 may be dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE 115 may be able to communicate with macro eNodeBs, pico eNodeBs, femto eNodeBs, relays, and the like.

The communication links 125 shown in the wireless communications system 100 may include uplink (UL) transmissions from a UE 115 to an eNodeB 105, and/or downlink (DL) transmissions, from an eNodeB 105 to a UE 115. The downlink transmissions may also be called forward link transmissions while the uplink transmissions may also be called reverse link transmissions.

In certain aspects of the wireless communications system 100, a UE 115 or an eNodeB 105 may include one or more RAT entities. A RAT entity may refer to a RAT layer, a RAT protocol layer, a RAT protocol entity, and/or other like architectural component associated with a communications protocol. In an aspect, the term "component" as used herein may be one of the parts that make up a system, may be hardware or software, and may be divided into other components. In some cases, the RAT entity may include a packet convergence entity such as a radio link control (RLC) entity or a PDCP entity. In other cases, however, the RAT entity may correspond or include an entity associated with a layer or protocol below a PDCP entity (e.g., a lower layer such as media access control (MAC) layer). The packet convergence entity may receive data packets (e.g., PDUs) from a first RAT link and a second RAT link in the wireless communications system 100. The packet convergence entity may identify from which of the first and second RAT links each data packet is received and may monitor a sequence number value of each of the received data packets based at least in part on their respective RAT link. The packet convergence entity may then perform one or more actions when the sequence number values of the data packets are received out of order. The one or more actions may include various operations for reordering, aggregating, and/or buffering the data packets as described herein. These operations may also include the use of reordering timers and/or reordering buffers. In one example, the packet convergence entity may deliver or send the data packets to an upper layer entity (e.g., IP layer) as they are received (e.g., either in order or out of order). The packet convergence entity may also reorder the data packets (e.g., if the received data packets are out of order) and ignore data packet losses before sending the data packets to the upper layer entity. Moreover, the packet convergence entity may request retransmissions of any missing data packets. In certain examples, the first RAT link may comprise a WWAN link (e.g., LTE link or UMTS link) and the second RAT link may comprise a WLAN link (e.g., Wi-Fi link).

In certain aspects of the wireless communications system 100, data packets are transmitted to a wireless communications device (e.g., UE 115, eNodeB 105) through a first RAT link (e.g., LTE or UMTS link) and a second RAT link (e.g., Wi-Fi link), where each of the data packets has an assigned sequence number value for data packet aggregation at a packet convergence entity (e.g., PDCP entity or RLC entity) within the wireless communications device. Flow control may be performed over the first and second RAT links, where the flow control is configured to prevent one or both of underflow and overflow of buffers for each of the RAT links.

Figure 2:
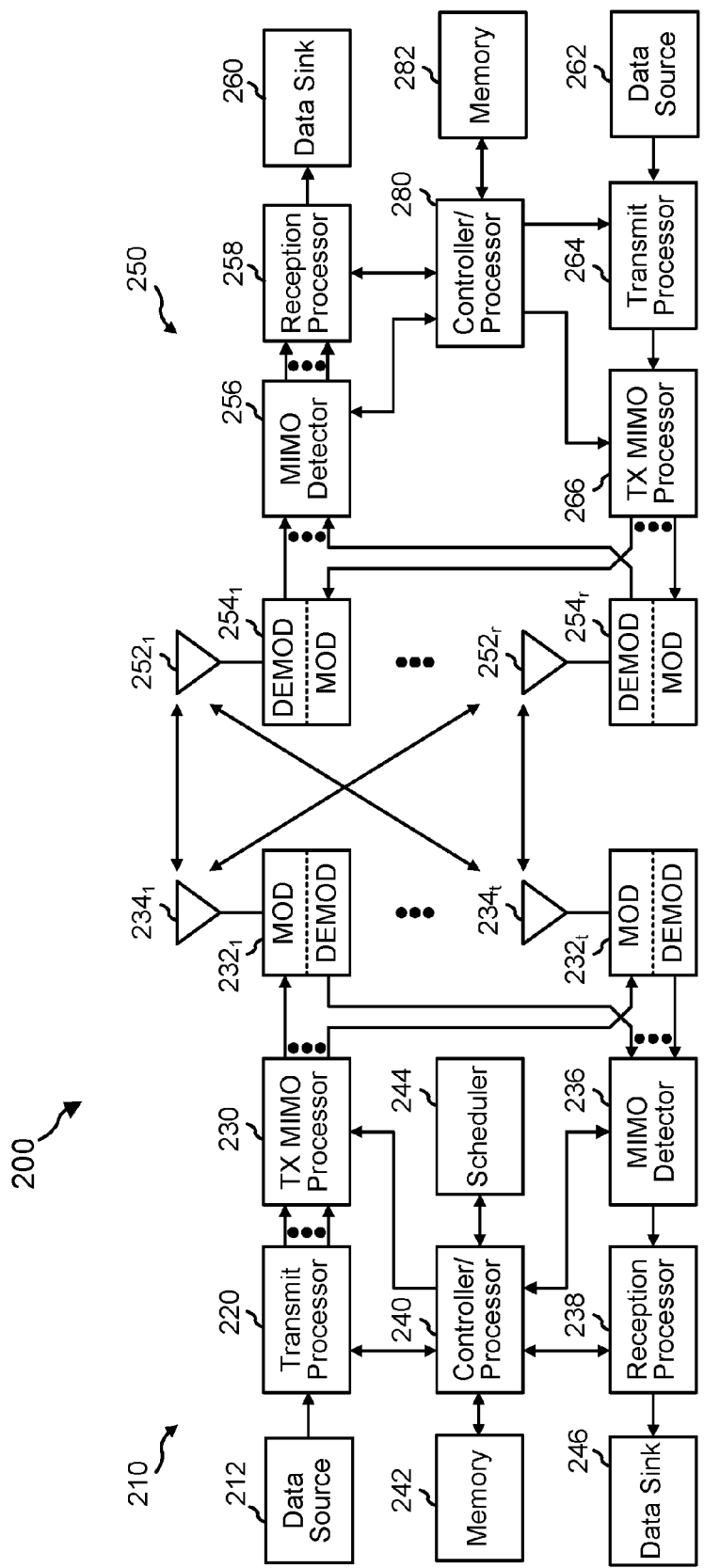
FIG. 2 is a block diagram conceptually illustrating examples of an eNodeB and a UE configured in accordance with an aspect of the present disclosure.

FIG. 2 is a block diagram conceptually illustrating examples of an eNodeB 210 and a UE 250 configured in accordance with an aspect of the present disclosure. For example, the base station/eNodeB 210 and the UE 250 of a system 200, as shown in FIG. 2, may be one of the base stations/eNodeBs and one of the UEs in FIG. 1, respectively. Moreover, the base station/eNodeB 210 and the UE 250 may be configured to perform techniques as described herein for aggregating data from a WWAN and a WLAN. The base station 210 may be equipped with antennas $234_{1-t}$, and the UE 250 may be equipped with antennas $252_{1-r}$, wherein t and r are integers greater than or equal to one.

At the base station 210, a base station transmit processor 220 may receive data from a base station data source 212 and control information from a base station controller/processor 240. The control information may be carried on the PBCH, PCFICH, PHICH, PDCCH, etc. The data may be carried on the PDSCH, etc. The base station transmit processor 220 may process (e.g., encode and symbol map) the data and control information to obtain data symbols and control symbols, respectively. The base station transmit processor 220 may also generate reference symbols, e.g., for the PSS, SSS, and cell-specific reference signal (RS). A base station transmit (TX) multiple-input multiple-output (MIMO) processor 230 may perform spatial processing (e.g., precoding) on the data symbols, the control symbols, and/or the reference symbols, if applicable, and may provide output symbol streams to the base station modulators/demodulators (MODs/DEMODs) $232_{1-t}$. Each base station modulator/demodulator 232 may process a respective output symbol stream (e.g., for OFDM, etc.) to obtain an output sample stream. Each base station modulator/demodulator 232 may further process (e.g., convert to analog, amplify, filter, and upconvert) the output sample stream to obtain a downlink signal. Downlink signals from modulators/demodulators $232_{1-t}$ may be transmitted via the antennas $234_{1-t}$, respectively.

At the UE 250, the UE antennas $252_{1-r}$ may receive the downlink signals from the base station 210 and may provide received signals to the UE modulators/demodulators (MODs/DEMODs) $254_{1-r}$, respectively. Each UE modulator/demodulator 254 may condition (e.g., filter, amplify, downconvert, and digitize) a respective received signal to obtain input samples. Each UE modulator/demodulator 254 may further process the input samples (e.g., for OFDM, etc.) to obtain received symbols. A UE MIMO detector 256 may obtain received symbols from all the UE modulators/demodulators $254_{1-r}$, and perform MIMO detection on the received symbols if applicable, and provide detected symbols. A UE reception processor 258 may process (e.g., demodulate, deinterleave, and decode) the detected symbols, provide decoded data for the UE 250 to a UE data sink 260, and provide decoded control information to a UE controller/processor 280.

On the uplink, at the UE 250, a UE transmit processor 264 may receive and process data (e.g., for the PUSCH) from a UE data source 262 and control information (e.g., for the PUCCH) from the UE controller/processor 280. The UE transmit processor 264 may also generate reference symbols for a reference signal. The symbols from the UE transmit processor 264 may be precoded by a UE TX MIMO processor 266 if applicable, further processed by the UE modulator/demodulators $254_{1-r}$ (e.g., for SC-FDM, etc.), and transmitted to the base station 310. At the base station 210, the uplink signals from the UE 250 may be received by the base station antennas 234, processed by the base station modulators/demodulators 232, detected by a base station MIMO detector 236 if applicable, and further processed by a base station reception processor 238 to obtain decoded data and control information sent by the UE 250. The base station reception processor 338 may provide the decoded data to a base station data sink 246 and the decoded control information to the base station controller/processor 240.

The base station controller/processor 240 and the UE controller/processor 280 may direct or control the operation at the base station 210 and the UE 250, respectively. The base station controller/processor 240 and/or other processors and modules at the base station 210 may perform or direct, e.g., the execution of the functional blocks illustrated in FIG. 10, FIG. 11, FIG. 12 and/or FIG. 13, various processes for the techniques described herein (e.g., flowcharts illustrated in FIG. 7, FIG. 8, FIG. 14, and/or FIG. 15). The UE controller/processor 280 and/or other processors and modules at the UE 250 may also perform or direct, e.g., the execution of the functional blocks illustrated in FIG. 9, FIG. 11, FIG. 12, and/or FIG. 13, and/or other processes for the techniques described herein (e.g., flowcharts illustrated in FIG. 7, FIG. 8, FIG. 14, and/or FIG. 15). The base station memory 242 and the UE memory 282 may store data and program codes (e.g., codes executable by a processor) for the base station 210 and the UE 250, respectively. For example, the UE memory 282 may store a set of DRX configurations provided by the base station 210. A scheduler 244 may be used to schedule UE 250 for data transmission on the downlink and/or uplink.

In one implementation, the base station 210 may include means for communicating data packets, by a packet convergence entity (e.g., PDCP entity), with a first RAT link and a second RAT link. The base station 210 may include means for determining or identifying from which of the first and second RAT links each data packet is received. The base station 210 may include means for monitoring a sequence number value of each of the data packets from the first and second RAT links, where the monitoring may be based at least in part on the respective RAT link of a received data packet. The base station 210 may include means for determining whether the sequence number values of the data packets received on the first and second RAT links are out of order. The base station 210 may include means for performing one or more actions when the determination is that the sequence number values of the data packets are out of order. The base station 210 may include means for exchanging packet status information in response to one or more events on one or both of the first RAT link and the second RAT link. In another implementation, the base station 210 may include means for transmitting data packets to a wireless communications device through a first RAT link and a second RAT link, where each of the data packets has an assigned sequence number value for data packet aggregation at a packet convergence entity (e.g., PDCP entity) within the wireless communications device. The base station 210 may include means for performing flow control over the first and second RAT links, where the flow control is configured to prevent one or both of underflow and overflow of buffers for each of the RAT links. In one aspect, the aforementioned means may be the base station controller/processor 240, the base station memory 242, the base station transmit processor 220, the base station modulators/demodulators 232, and the base station antennas 234 configured to perform the functions recited by the aforementioned means. In another aspect, the aforementioned means may be a module, component, or any apparatus configured to perform the functions recited by the aforementioned means. Examples of such modules, components, or apparatus may be described with respect to FIG. 4A, FIG. 4B, FIG. 4C, FIG. 5, FIG. 6, FIG. 9, FIG. 10, FIG. 11, FIG. 12, and/or FIG. 13.

In one configuration, the UE 250 may include means for communicating data packets, at a packet convergence entity (e.g., PDCP entity), with a first RAT link and a second RAT link. The UE 250 may include means for determining or identifying from which of the first and second RAT links each data packet is received. The UE 250 may include means for monitoring a sequence number value of each of the data packets from the first and second RAT links, where the monitoring may be based at least in part on the respective RAT link of a received data packet. The UE 250 may include means for determining whether the sequence number values of the data packets received on the first and second RAT links are out of order. The UE 250 may include means for performing one or more actions when the determination is that the sequence number values of the data packets are out of order. The UE 250 may include means for exchanging packet status information in response to one or more events on one or both of the first RAT link and the second RAT link. In another configuration, the UE 250 may include means for transmitting data packets to a wireless communications device through a first RAT link and a second RAT link, wherein each of the data packets has an assigned sequence number value for data packet aggregation at a packet convergence entity (e.g., PDCP entity or RLC entity) within the wireless communications device. The UE 250 may include means for performing flow control over the first and second RAT links, where the flow control is configured to prevent one or both of underflow and overflow of buffers for each of the first and second RAT links. In one aspect, the aforementioned means may be the UE controller/processor 280, the UE memory 282, the UE reception processor 258, the UE MIMO detector 256, the UE modulators/demodulators 254, and the UE antennas 252 configured to perform the functions recited by the aforementioned means. In another aspect, the aforementioned means may be a module, component, or any apparatus configured to perform the functions recited by the aforementioned means. Examples of such modules, components, or apparatus may be described with respect to FIG. 4A, FIG. 4B, FIG. 4C, FIG. 5, FIG. 6, FIG. 9, FIG. 10, FIG. 11, FIG. 12, and/or FIG. 13.

Figure 3:
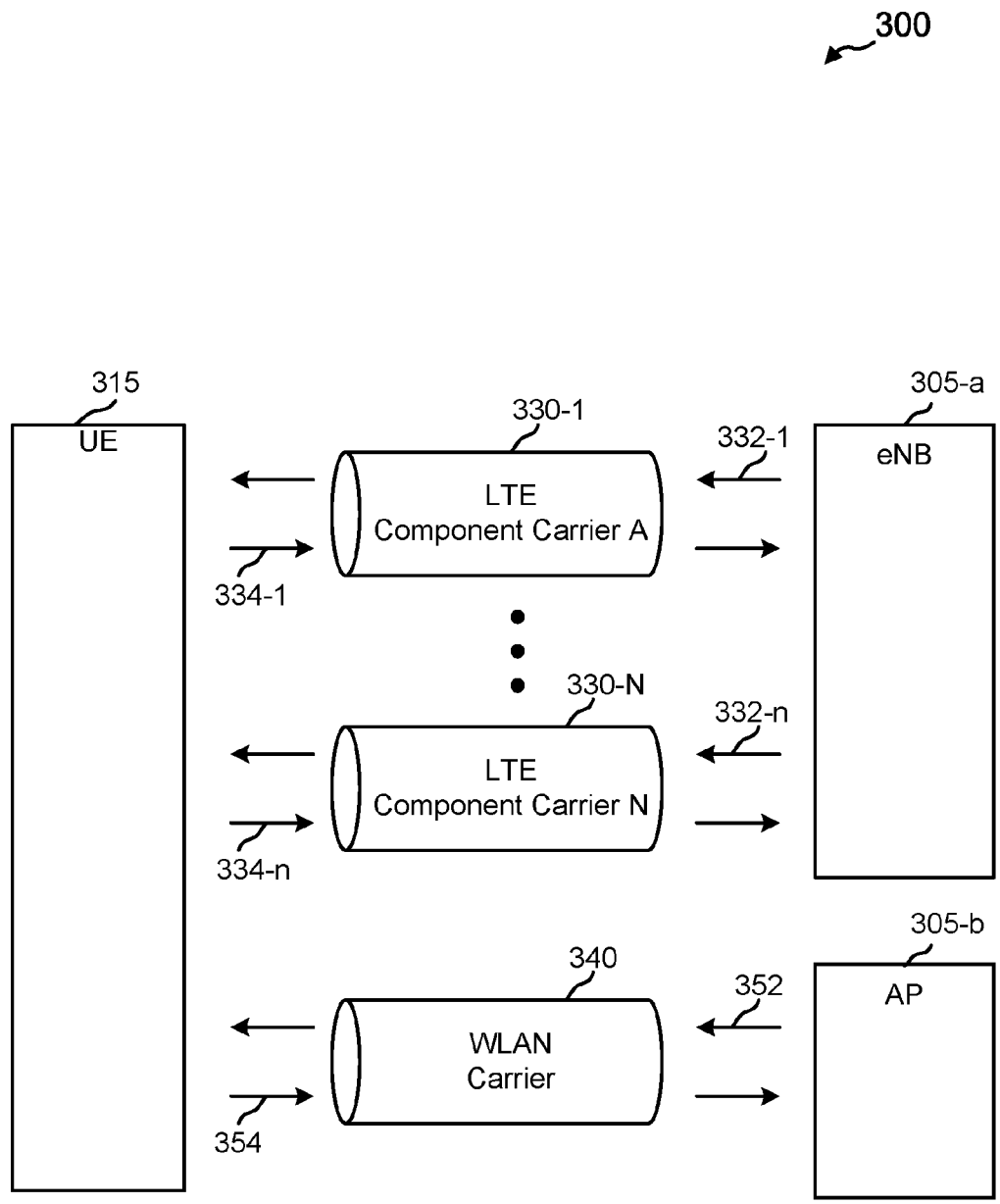
FIG. 3 is a block diagram conceptually illustrating an aggregation of WWAN and WLAN radio access technologies at a UE, in accordance with an aspect of the present disclosure.

FIG. 3 is a block diagram conceptually illustrating an aggregation of WWAN and WLAN radio access technologies at a UE, in accordance with an aspect of the present disclosure. The aggregation may occur in a system 300 including a multi-mode UE 315, which can communicate with an eNodeB 305-*a* using one or more component carriers 1 through N ($CC_1$-$CC_N$), and with a WLAN access point (AP) 305-*b* using WLAN carrier 340. A multi-mode UE in this example may refer to a UE that supports more than one RAT. For example, the UE 315 supports at least a cellular technology (e.g., LTE) and an unlicensed spectrum technology (e.g., WLAN/Wi-Fi). The UE 315 may be an example of one of the UEs of FIG. 1, FIG. 2, FIG. 4A, FIG. 4B, FIG. 4C, FIG. 5, FIG. 6, FIG. 9, and/or FIG. 10. The eNodeB 305-*a* may be an example of one of the eNodeBs or base stations of FIG. 1, FIG. 2, FIG. 4A, FIG. 4B, FIG. 4C, FIG. 5, FIG. 6, FIG. 9, and/or FIG. 10. While only one UE 305, one eNodeB 305-*a*, and one AP 305-*b* are illustrated in FIG. 3, it will be appreciated that the system 300 can include any number of UEs 305, eNodeBs 305-*a*, and/or APs 305-*b*.

The eNodeB 305-*a* can transmit information to the UE 315 over forward (downlink) channels 332-1 through 332-N on LTE component carriers $CC_1$ through $CC_N$ 330. In addition, the UE 315 can transmit information to the eNodeB 305-*a* over reverse (uplink) channels 334-1 through 334-N on LTE component carriers $CC_1$ through $CC_N$. Similarly, the AP 305-*b* may transmit information to the UE 315 over forward (downlink) channel 352 on WLAN carrier 340. In addition, the UE 315 may transmit information to the AP 305-b over reverse (uplink) channel 354 of WLAN carrier 340.

In describing the various entities of FIG. 3, as well as other figures associated with some of the disclosed embodiments, for the purposes of explanation, the nomenclature associated with a 3GPP LTE or LTE-A wireless network is used. However, it is to be appreciated that the system 300 can operate in other networks such as, but not limited to, an OFDMA wireless network, a CDMA network, a 3GPP2 CDMA2000 network and the like.

In multi-carrier operations, the downlink control information (DCI) messages associated with different UEs 315 can be carried on multiple component carriers. For example, the DCI on a PDCCH can be included on the same component carrier that is configured to be used by a UE 315 for physical downlink shared channel (PDSCH) transmissions (i.e., same-carrier signaling). Alternatively, or additionally, the DCI may be carried on a component carrier different from the target component carrier used for PDSCH transmissions (i.e., cross-carrier signaling). In some implementations, a carrier indicator field (CIF), which may be semi-statically enabled, may be included in some or all DCI formats to facilitate the transmission of PDCCH control signaling from a carrier other than the target carrier for PDSCH transmissions (cross-carrier signaling).

In the present example, the UE 315 may receive data from one eNodeB 305-a. However, users on a cell edge may experience high inter-cell interference which may limit the data rates. Multiflow allows UEs to receive data from two eNodeBs 305-a simultaneously. Multiflow works by sending and receiving data from the two eNodeBs 305-a in two totally separate streams when a UE is in range of two cell towers in two adjacent cells at the same time. The UE talks to two eNodeB 305-a simultaneously when the device is on the edge of either eNodeBs' reach. By scheduling two independent data streams to the mobile device from two different eNodeBs at the same time, multiflow exploits uneven loading in HSPA networks. This helps improve the cell edge user experience while increasing network capacity. In one example, throughput data speeds for users at a cell edge may double. In some aspects, multiflow may also refer to the ability of a UE to talk to a cell tower and a WLAN tower (e.g., AP) simultaneously when the UE is within the reach of both towers. Multiflow is a feature of LTE/LTE-A that is similar to dual-carrier HSPA, however, there are differences. For example, dual-carrier HSPA doesn't allow for connectivity to multiple towers to connect simultaneously to a device.

Previously, LTE-A standardization, LTE component carriers 330 have been backward-compatible, which enabled a smooth transition to new releases. However, this feature caused the LTE component carriers 330 to continuously transmit common reference signals (CRS, also referred to as cell-specific reference signals) in every subframe across the bandwidth. Most cell site energy consumption is caused by the power amplifier, as the cell remains on even when only limited control signaling is being transmitted, causing the amplifier to continue to consume energy. CRS were introduced in release 8 of LTE and are LTE's most basic downlink reference signal. The CRSs are transmitted in every resource block in the frequency domain and in every downlink subframe. CRS in a cell can be for one, two, or four corresponding antenna ports. CRS may be used by remote terminals to estimate channels for coherent demodulation. A New Carrier Type (NCT) allows temporarily switching off of cells by removing transmission of CRS in four out of five sub frames. This feature reduces power consumed by the power amplifier, as well as the overhead and interference from CRS, as the CRS is no longer continuously transmitted in every subframe across the bandwidth. In addition, the New Carrier Type allows the downlink control channels to be operated using UE-specific Demodulation Reference Symbols. The New Carrier Type might be operated as a kind of extension carrier along with another LTE/LTE-A carrier or alternatively as standalone non-backward compatible carrier.

Regarding the present example, it is to be understood that while data aggregation of WWAN and WLAN radio access technologies is described in connection with a UE, data of WWAN and WLAN radio access technologies may be similarly aggregated at an eNodeB.

Figure 4A:
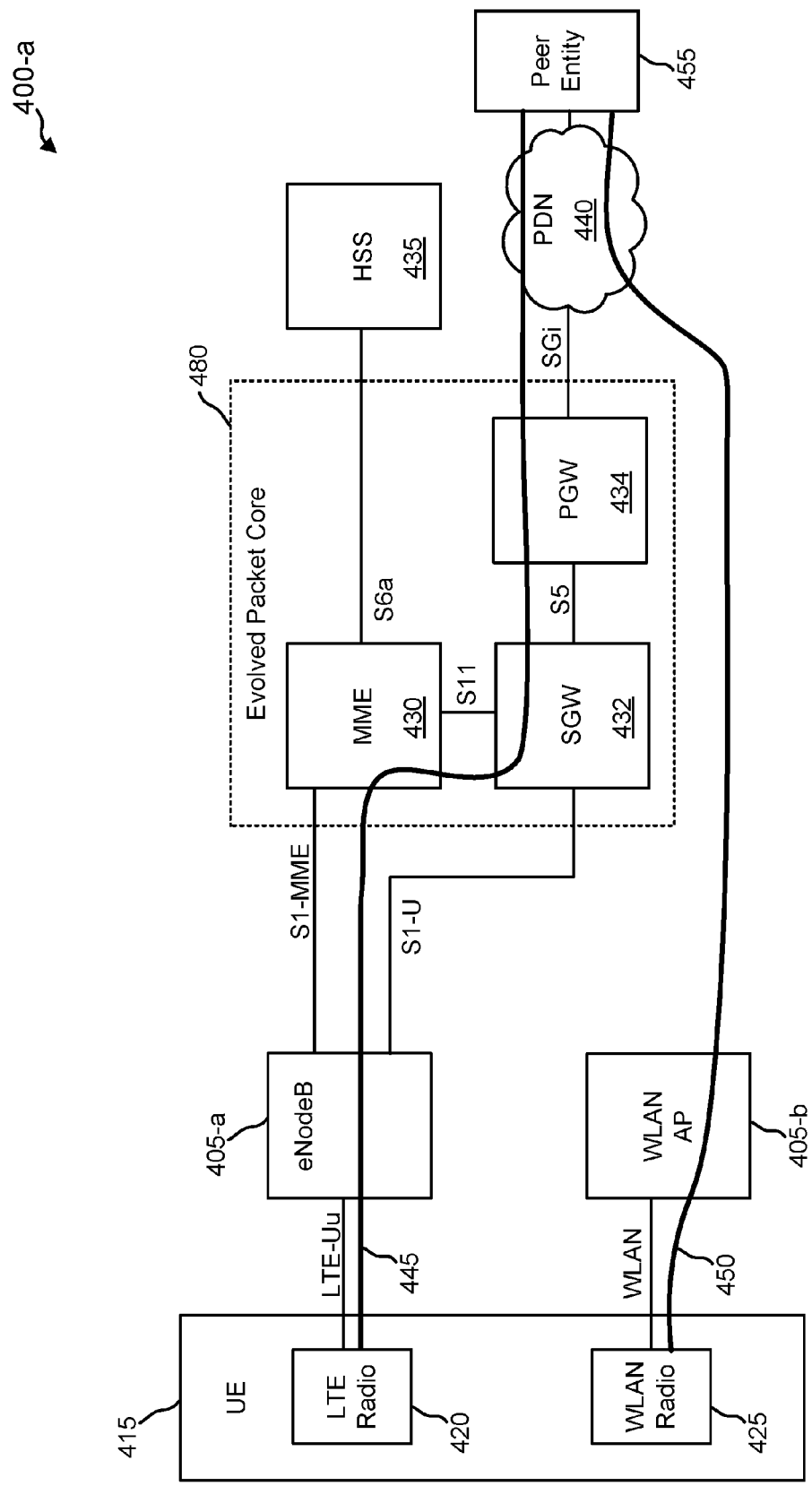
FIG. 4A is a block diagram conceptually illustrating an example of data paths between a UE and a Packet Data Network (PDN) in accordance with an aspect of the present disclosure.

FIG. 4A is a block diagram conceptually illustrating an example of data paths 445 and 450 between a UE 415 and a PDN 440 (e.g., Internet) in accordance with an aspect of the present disclosure. The data paths 445, 450 are shown within the context of a wireless communications system 400-a for aggregating data from WWAN and WLAN radio access technologies. The system 300 of FIG. 3 may be an example of portions of the wireless communications system 400-a. The wireless communications system 400-a may include a multi-mode UE 415, an eNodeB 405-a, a WLAN AP 405-b, an evolved packet core (EPC) 480, a PDN 440, and a peer entity 455. The EPC 480 may include a mobility management entity (MME) 430, a serving gateway (SGW) 432, and a PDN gateway (PGW) 434. A home subscriber system (HSS) 435 may be communicatively coupled with the MME 430. The UE 415 may include an LTE radio 420 and a WLAN radio 425. These elements may represent aspects of one or more of their counterparts described above with reference to the previous or subsequent Figures. For example, the UE 415 may be an example of UEs in FIG. 1, FIG. 2, FIG. 3, FIG. 5, FIG. 6, FIG. 9, and/or FIG. 10, the eNodeB 405-a may be an example of the eNodeBs/base stations of FIG. 1, FIG. 2, FIG. 3, FIG. 5, FIG. 6, FIG. 9, and/or FIG. 10, the AP 405-b may be an example of the APs of FIG. 3, FIG. 5, FIG. 9, and/or FIG. 10, and/or the EPC 480 may be an example of the core network of FIG. 1 and/or FIG. 10.

Referring back to FIG. 4A, the eNodeB 405-a and the AP 405-b may be capable of providing the UE 415 with access to the PDN 440 using the aggregation of one or more LTE component carriers or one or more WLAN component carriers. Using this access to the PDN 440, the UE 415 may communicate with the peer entity 455. The eNodeB 405-a may provide access to the PDN 440 through the evolved packet core 480 (e.g., through data path 445), and the WLAN AP 405-b may provide direct access to the PDN 440 (e.g., through data path 450).

The MME 430 may be the control node that processes the signaling between the UE 415 and the EPC 480. Generally, the MME 430 may provide bearer and connection management. The MME 430 may, therefore, be responsible for idle mode UE tracking and paging, bearer activation and deactivation, and SGW selection for the UE 415. The MME 430 may communicate with the eNodeB 405-a over an S1-MME interface. The MME 430 may additionally authenticate the UE 415 and implement Non-Access Stratum (NAS) signaling with the UE 415.

The HSS 435 may, among other functions, store subscriber data, manage roaming restrictions, manage accessible access point names (APNs) for a subscriber, and associate subscribers with MMES 430. The HSS 435 may communicate with the MME 430 over an S6a interface defined by the Evolved Packet System (EPS) architecture standardized by the 3GPP organization.

All user IP packets transmitted over LTE may be transferred through eNodeB 405-*a* to the SGW 432, which may be connected to the PDN gateway 434 over an S5 signaling interface and the MME 430 over an S11 signaling interface. The SGW 432 may reside in the user plane and act as a mobility anchor for inter-eNodeB handovers and handovers between different access technologies. The PDN gateway 435 may provide UE IP address allocation as well as other functions.

The PDN gateway 434 may provide connectivity to one or more external packet data networks, such as PDN 440, over an SGi signaling interface. The PDN 440 may include the Internet, an Intranet, an IP Multimedia Subsystem (IMS), a Packet-Switched (PS) Streaming Service (PSS), and/or other types of PDNs.

In the present example, user plane data between the UE 415 and the EPC 480 may traverse the same set of one or more EPS bearers, irrespective of whether the traffic flows over path 445 of the LTE link or path 450 of the WLAN link. Signaling or control plane data related to the set of one or more EPS bearers may be transmitted between the LTE radio 420 of the UE 415 and the MME 430 of the EPC 480, by way of the eNodeB 405-*a*.

Figure 4B:
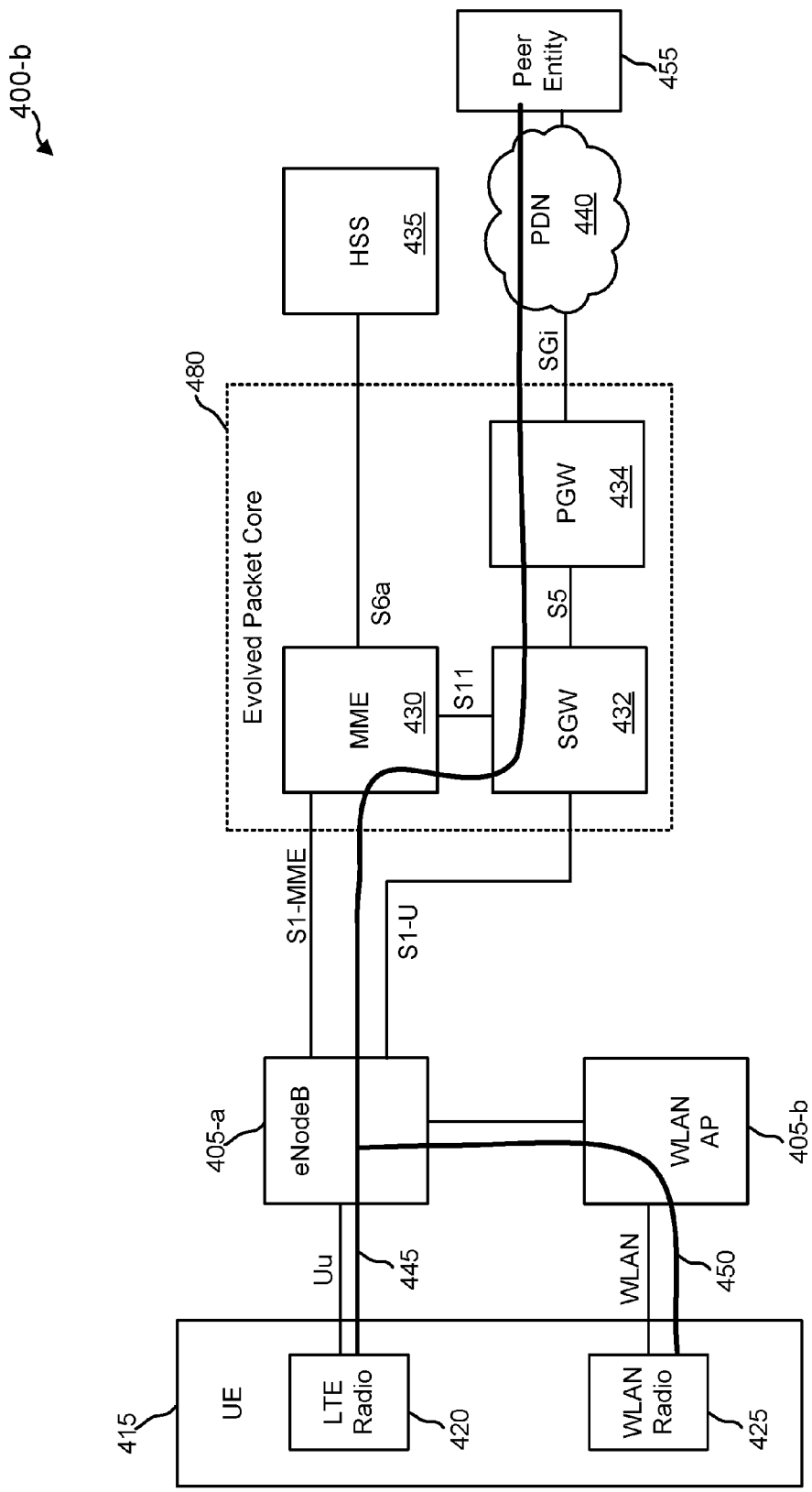
FIG. 4B is a block diagram conceptually illustrating another example of data paths between a UE and a PDN in accordance with an aspect of the present disclosure.

FIG. 4B is a block diagram conceptually illustrating another example of data paths 445 and 450 between the UE 415 and the PDN 440 in accordance with an aspect of the present disclosure. The data paths 445, 450 are shown within the context of a wireless communications system 400-*b* for aggregating data from WLAN and WWAN radio access technologies, which is substantially similar to the wireless communications system 400-*a* of FIG. 4A. The eNodeB 405-*a* and AP 405-*b* in FIG. 4B may be collocated or otherwise in high-speed communication with each other. In this example, EPS bearer-related data between the UE 415 and the WLAN AP 405-*b* may be routed to the eNodeB 405-*a*, and then to the EPC 480. In this way, all EPS bearer-related data may be forwarded along the same path between the eNodeB 405-*a*, the EPC 480, the PDN 440, and the peer entity 455.

Figure 4C:
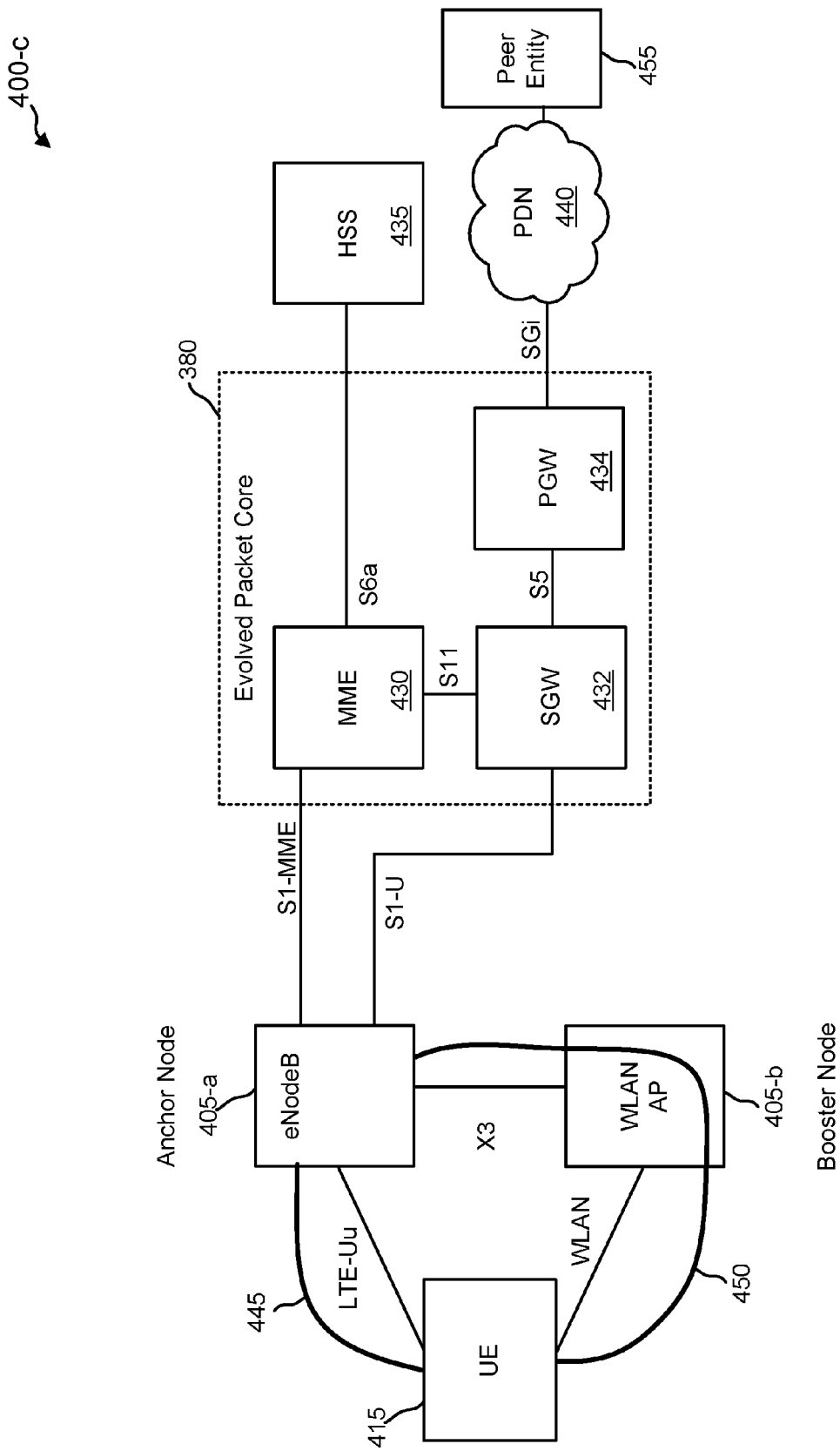
FIG. 4C is a block diagram conceptually illustrating an example where aggregation uses PDCP that terminates at an anchor eNodeB in accordance with an aspect of the present disclosure.

FIG. 4C is a block diagram conceptually illustrating an example where aggregation uses PDCP that terminates at the anchor eNodeB 405-*a* in accordance with an aspect of the present disclosure. A wireless communications system 400-*c* for aggregating data from WLAN and WWAN radio access technologies is substantially similar to the wireless communications systems 400-*a* and 400-*b* of FIG. 4A and FIG. 4B, respectively. The eNodeB 405-*a* and AP 405-*b* in FIG. 4C may be collocated or otherwise in high-speed communication with each other. In this example, EPS bearer-related data between the UE 415 and the eNodeB 405-*a* may be transmitted over data paths 445 and 450 and may be aggregated at a receiving device using PDCP. For example, the data aggregation in FIG. 4C may be such that PDCP terminates at a node (e.g., eNodeB 405-*a*) that acts as anchor for the data plane aggregating the data (e.g., PDUs) for another node (e.g., WLAN AP 405-*b*) that acts as a booster node. In one implementation, the eNodeB 405-*a* may transmit data packets having sequence number values over both data paths 445 and 450 (e.g., LTE link and Wi-Fi link), and the data packets may be aggregated by the UE 415 using a packet convergence entity (e.g., PDCP layer or RLC layer). In another implementation, the UE 415 may transmit data packets having sequence number values over both data paths 445 and 450 (e.g., LTE link and Wi-Fi link), and the data packets may be aggregated by the eNodeB 405-*a* using a packet convergence entity (e.g., PDCP layer or RLC layer). In either of these implementations, when the packets are received out of order, the packet convergence entity may perform one or more actions to handle missing and/or not received packets.

While aspect of FIG. 4A, FIG. 4B, and FIG. 4C have been described with respect to LTE, similar aspects regarding data aggregation or convergence may also be implemented with respect to UMTS or other similar system or network wireless communications radio technologies.

Figure 5:
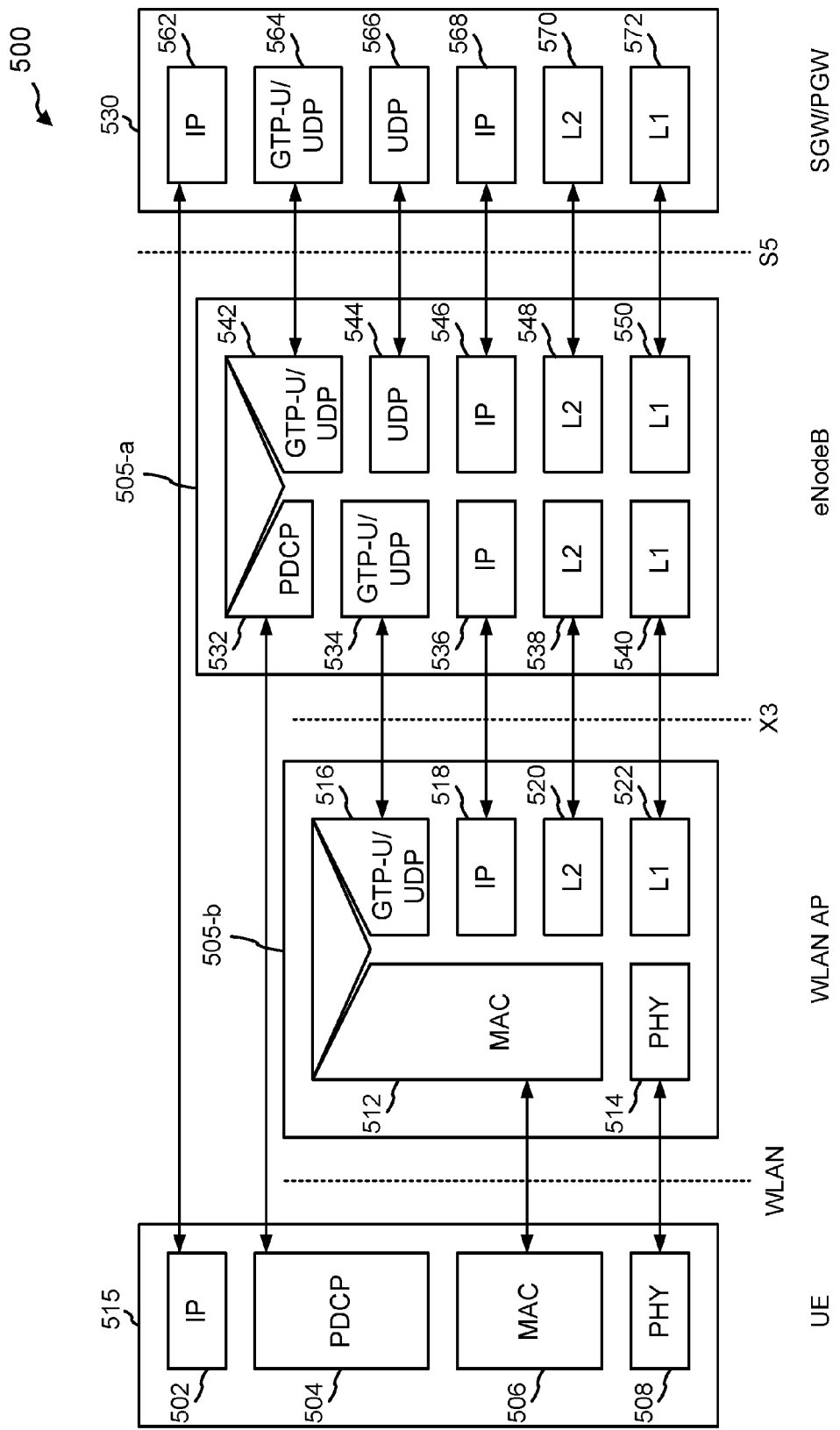
FIG. 5 is a block diagram conceptually illustrating an example of a PDN Gateway (PGW) user plane where aggregation uses PDCP that terminates at an anchor eNodeB in accordance with an aspect of the present disclosure.

FIG. 5 is a block diagram conceptually illustrating an example of a PGW user plane where aggregation uses PDCP that terminates at an anchor eNodeB 505-*a* in accordance with an aspect of the present disclosure. A wireless communications system 500 includes a UE 515, an eNodeB 505-*a*, a WLAN AP 505-*b*, and an SGW/PGW 530. The UE 515 may be an example of the UEs in FIG. 1, FIG. 2, FIG. 3, FIG. 4A, FIG. 4B, FIG. 4C, FIG. 6, FIG. 9, and/or FIG. 10. The eNodeB 505-*a* may be an example of the eNodeBs in FIG. 1, FIG. 2, FIG. 3, FIG. 4A, FIG. 4B, FIG. 4C, FIG. 6, FIG. 9, and/or FIG. 10. The WLAN AP 505-*b* may be an example of the APs in FIG. 3, FIG. 4A, FIG. 4B, FIG. 4C, FIG. 9, and/or FIG. 10. Moreover, the SGW/PGW 530 may be an example of various aspects of the SGW 432 and the PGW 434 in FIG. 4A, FIG. 4B, and FIG. 4C.

The UE 515 may include multiple components or entities. For example, the UE 515 may include a physical layer (PHY) entity 508, a MAC layer entity 506, a PDCP entity 504, and an IP entity 502. In this example, the IP entity 502 may be referred to as an upper layer or entity with respect to the PDCP entity 504, while the MAC layer entity 506 and the PHY entity 508 may be referred to as lower layers or entities with respect to the PDCP entity 504.

The WLAN AP 505-*b* may include multiple components or entities. For example, the WLAN AP 505-*b* may include a MAC layer entity 512, a PHY entity 514, a GPRS tunneling protocol over user datagram protocol (GTP-U)/UDP entity 516, an IP entity 518, a level 2 (L2) entity 520, and a level 1 (L1) entity 522.

The eNodeB 505-*a* may include multiple components or entities. For example, the eNodeB 505-*a* may include a PDCP entity 532, a GTP-U/UDP entity 534, an IP entity 536, an L2 entity 538, an L1 entity 540, a GTP-U/UDP entity 542, a UDP entity 544, an IP entity 546, an L2 entity 548, and an L1 entity 550.

The SGW/PGW 530 may include an IP entity 562, a GTP-U/UDP entity 564, a UDP entity 566, an IP entity 568, an L2 entity 570, and an L1 entity 572.

Also shown in FIG. 5 are user plane interfaces between the various devices. For example, FIG. 5 shows a WLAN interface (e.g., IEEE 802.11 interface) between the UE 515 and the WLAN AP 505-*b*, an X3 interface between the WLAN AP 505-*b* and the eNodeB 505-*a*, and an S5 interface between the eNodeB 505-*a* and the SGW/PGW 530. It would be understood that not all the interfaces taking place in the wireless communications system 500 are shown or illustrated in FIG. 5.

In one implementation, the eNodeB 505-*a* and the UE 515 may communicate some of the data packets for aggregation by the appropriate PDCP entities without the need to go through the WLAN AP 505-*b*. For example, the eNodeB 505-*a* and the UE 515 may use the PDCP entities 532 and 504, respectively, without the need to go through the WLAN AP 505-*b*. The eNodeB 505-*a* and the UE 515 may communicate the remaining data packets for aggregation through the WLAN AP 505-*b*. For example, the UE 515 may use lower layer entities (e.g., MAC entity 506 and/or PHY entity 508) to communicate with entities in the WLAN AP 505-b (e.g., MAC entity 512 and/or PHY entity 514), and the WLAN AP 505-b may use lower layer entities (e.g., GTP-U/UDP 516, IP entity 518, L2 entity 520, and/or L1 entity 522) to communicate entities in the eNodeB 505-a (e.g., GTP-U/UDP 534, IP entity 536, L2 entity 538, and/or L1 entity 540).

Figure 6:
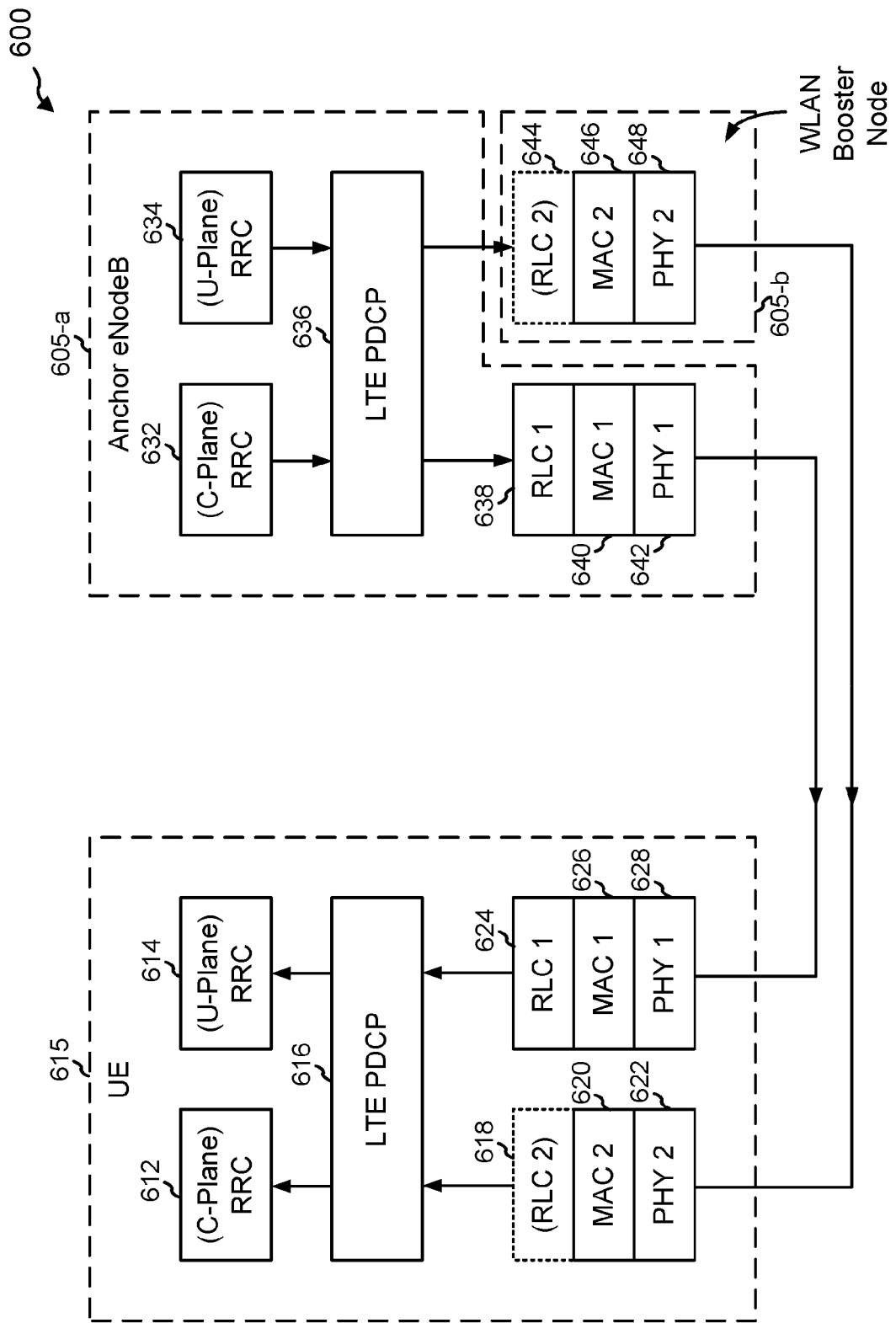
FIG. 6 is a block diagram conceptually illustrating an example of packet level aggregation using a single PDCP in accordance with an aspect of the present disclosure.

FIG. 6 is a block diagram conceptually illustrating an example of packet level aggregation using a single LTE PDCP 616 in accordance with an aspect of the present disclosure. A wireless communications system 600 includes an anchor eNodeB 605-a, a WLAN booster node (e.g., AP) 605-b, and a UE 615. The anchor eNodeB 605-a, the WLAN booster node 605-b, and the UE 615 may be examples of similar devices shown in various Figures. The wireless communications system 600 illustrates both protocol stacks (e.g., WWAN and WLAN) with PDCP aggregation.

The UE 615 may include a control plane (C-Plane) radio resource control (RRC) entity 612, a user plane (U-Plane) RRC entity 614, an LTE PDCP entity 616, a WLAN radio link controller (RLC) entity 618 (RLC 2), a WLAN MAC entity 620 (MAC 2), a WLAN PHY entity 622 (PHY 2), a WWAN RLC entity 624 (RLC 1), a WWAN MAC entity 626 (MAC 1), and a WWAN PHY entity 628 (PHY 1).

The WLAN booster node 605-b may include an RLC entity 644 (RLC 2), a MAC entity 646 (MAC 2), and a PHY entity 648 (PHY 1).

The anchor eNodeB 605-a may include a C-Plane RRC entity 632, a U-Plane RRC entity 634, an LTE PDCP entity 636, an RLC entity 638 (RLC 1), a MAC entity 640 (MAC 1), and a PHY entity 642 (PHY 1).

In downlink operations, the LTE PDCP 616 at the UE 615 may aggregate packets and may handle operations related to packets received out of order. The LTE PDCP 616 may receive data packets from the LTE PDCP entity 636 in the anchor eNodeB 905-a through RLC 1, MAC 1, and PHY 1 in the eNodeB 605-a and then through WWAN PHY 1, WWAN MAC 1, and WWAN RLC 1 in the UE 615. The LTE PDCP 616 may also receive data packets from the LTE PDCP entity 636 in the anchor eNodeB 905-a through RLC 2, MAC 2 and PHY 2 in the booster node 605-b and then through WLAN PHY 2, WLANMAC 2, and WLAN RLC 2 in the UE 615. In an example, RLC 2 may not be needed with PHY2/MAC 2, which corresponds to the WLAN booster node. Uplink operations (from the UE 615 to the eNodeB 605-a) may operate in a substantially similar manner as the downlink operations.

To handle some of the aspects described herein regarding data packets received out of order during aggregation, a PDCP entity (e.g., LTE PDCP entity 616) may have to assume in-order data packet delivery from the entities below (e.g. RLC). That is, the entity may assume that the correct order of data packets is received or sent in order not to disrupt transmission control protocol (TCP) performance. The PDCP entity may also be configured to address other issues that may arise with data packet aggregation. For example, PDCP may lack reliability support. If one of the aggregated cells is deconfigured/deactivated, this may cause RLC PDU drops from the cell buffer. In an example, PDCP level aggregation may not have a mechanism to send acknowledgments (ACKs) and/or negative-acknowledgments (NACKs) for service data units (SDUs) or other types of data units. PDCP may also not generally support segmentation.

Aggregation at the PDCP level (or at similar protocol levels or layers) may involve PDCP operation over multiple RAT links that may have different properties in terms of data packet errors and order of data packet delivery to PDCP. In an example, the PDCP entity handling data aggregation may be configured to reduce or minimize the impact of such different link properties on upper layers and performance. As described herein, a PDCP entity may refer to both an entity handling PDCP layer and an entity handling PDCP protocol. Similarly, other entities may also refer to either the respective layer or the respective protocol. Moreover, while the description provided below refers to PDCP aggregation operation over two separate RAT links, the approaches, methods, and techniques described may be generalized to more than two RAT links. In addition, PDCP aggregation operations as described herein may be similarly implemented by a PDCP entity in a different device, e.g., in an eNodeB (e.g., anchor eNodeB).

The manner in which aggregation may be handled at the PDCP level may be based at least in part on packet errors at each of the RAT links used and/or the order (e.g., a sequence number value or SN value) of the PDCP packets (e.g., PDUs). PDCP level aggregation may take into account lossless and lossy (e.g., a PDU not delivered) transmissions. The data packets delivered to the PDCP entity may be transmitted in an ascending sequence order, where the sequence number values of the PDCP PDUs increase with the order of time delivery (up to modulo), or may be transmitted in a non-ascending sequence order. In some examples, the number values in a sequence need not be in ascending order (e.g., non-ascending delivery), however, the number values in such a sequence may still provide sufficient information to determine whether the respective data packets are received out of order.

In one example, a first RAT link (e.g., LTE link) may provide a lossless and ascending order data packet delivery (e.g. RLC acknowledge mode (AM)) while a second RAT link (e.g. Wi-Fi link) may provide a lossy and either ascending or non-ascending delivery. In such cases, the PDCP entity handling aggregation at the device receiving the packets may perform one of several different sets of actions. In a first set of actions, the PDCP entity may deliver or send a PDCP packet to upper layers entity upon reception (e.g., without processing) from either first or second RAT link. In these cases, out-of-order data packet receptions and losses of data packet may be handled by upper layers entities (e.g., TCP retransmissions). In a second set of actions, the PDCP entity may reorder the received PDCP packets while ignoring losses of PDCP packets (e.g., missing or not received packets). For example, the PDCP entity may attempt to reorder the PDCP packets in ascending order if they are received out of order and provide the ascending order PDCP packet to the upper layer. However, to prevent delays or errors on one RAT link that may cause a deadlock, PDCP packets may be delivered to the upper layer entity after a time period (e.g., a timeout value), in which the PDCP entity may attempt to reorder the out of order PDCP packets. In the event of the expiration of the time period, the ascending sequence number property may be violated and the PDCP entity may deliver the out of order PDCP packets to the upper layer entity. The data packet losses may then be handled by the upper layers. In a third set of actions, the PDCP entity may request retransmissions of data packets that may be identified to be missing or not received. In these cases, the PDCP entity may attempt to ask for retransmission of the missing or non-received packets and wait for the retransmission of the missing or non-received data packets. In an example, the PDCP entity may send acknowledgments (ACKs) and/or negative-acknowledgments (NACKs) of received and non-received data packets. In this example, the PDCP entity may provide delivery of all packets in sequence similar to the RLC acknowledgement mode (AM). In the second and third set of actions, the PDCP entity may be aware of the RAT links a packet (e.g., PDU) is received from. In some examples, different separate sequence numbering specific for each of the RAT links may also be introduced to potentially enable operation with smaller reordering timer values. For example, the PDCP entity may include a separate disjoint sequence number values of data packets transmitted over each of the RAT links.

Figure 7:
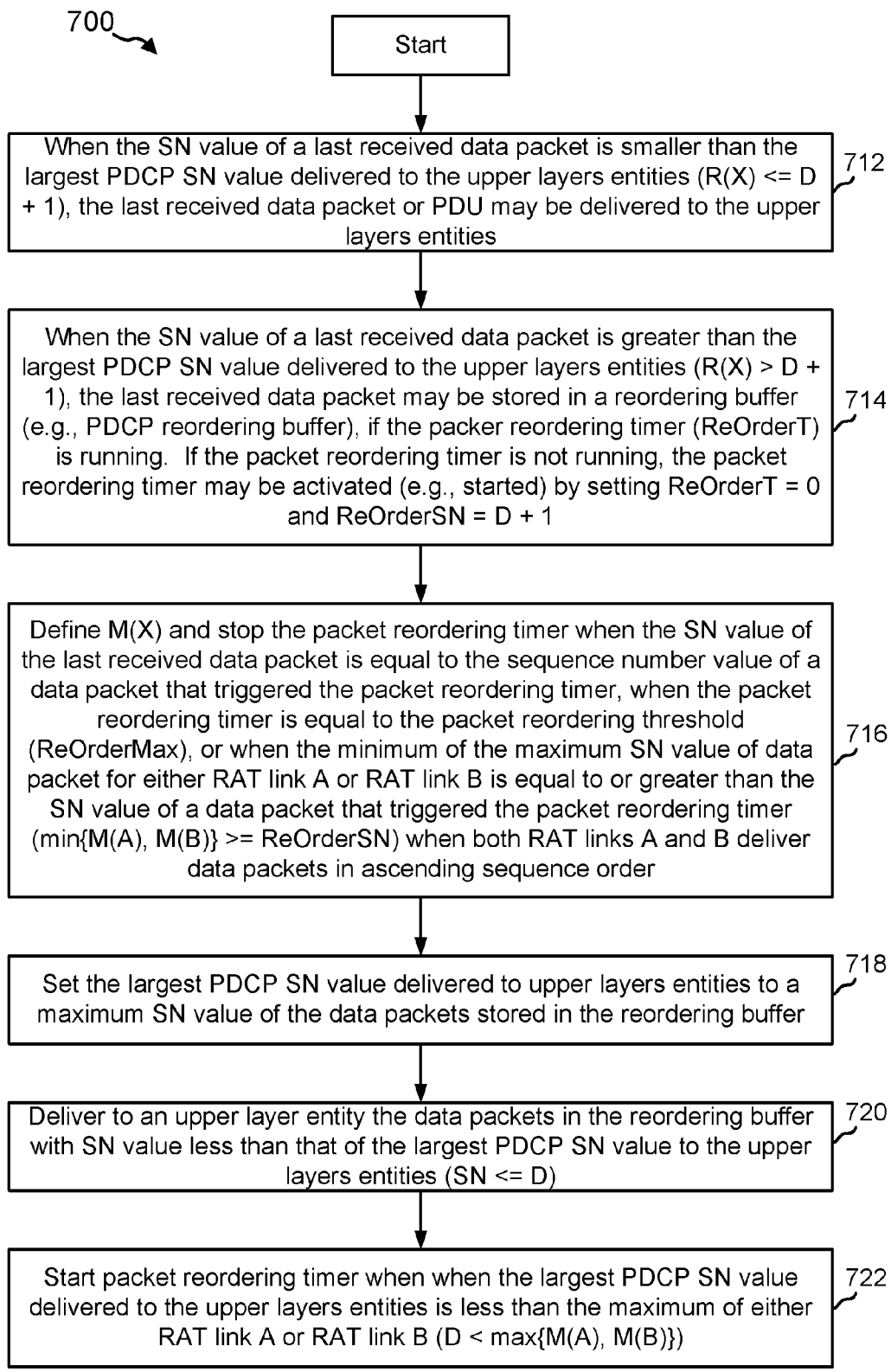
FIG. 7 is a flowchart illustrating a method for handling aggregation at a packet convergence entity in accordance with an aspect of the present disclosure.

FIG. 7 is a flowchart illustrating a method 700 for handling aggregation at a packet convergence entity (e.g., PDCP layer entity) in accordance with an aspect of the present disclosure. Some or all of the method 700 may be implemented by the UEs, eNodeBs, base stations, components, and/or devices of FIG. 1, FIG. 2, FIG. 3, FIG. 4A, FIG. 4B, FIG. 4C, FIG. 5, FIG. 6, FIG. 9, FIG. 10, FIG. 11, FIG. 12, and/or FIG. 13. Some or all of the method 700 may correspond to the second set of actions described above. Regarding the method 700, a first of the two RAT links (e.g., LTE or UMTS link) for PDCP data aggregation at a packet convergence entity (e.g., PDCP entity or RLC entity) may be referred to as RAT link A (or simply A) and may provide ascending-order data packet delivery, while the second of the two RAT links (e.g., Wi-Fi link) for PDCP data aggregation may be referred to as RAT link B (or simply B). Moreover, let D be the largest PDCP sequence number (SN) value delivered to the upper layers entities, and R(A) and R(B) may indicate the sequence number value of the last PDU received on RAT link X, where X=A or B. Also ReOrderT may be a packet reordering timer (or simply a reordering timer), which is incremented with, for example, a clock tick when it is running (active) and used as described below. The following aspects of the method 700 are applied to each received PDCP packet (e.g., PDU or data packet) R(X) from lower layers entities on either RAT link A or RAT link B.

At block 712, when the SN value of a last received data packet is smaller than the largest PDCP SN value delivered to the upper layers entities (R(X)<=D+1), the last received data packet or PDU may be delivered to the upper layers entities (e.g., IP entity).

At block 714, when the SN value of a last received data packet is greater than the largest PDCP SN value delivered to the upper layers entities (R(X)>D+1), the last received data packet may be stored in a reordering buffer (e.g., PDCP reordering buffer), if the packer reordering timer (ReOrderT) is running. On the other hand, if the packet reordering timer is not running, the packet reordering timer may be activated (e.g., started) by setting ReOrderT=0 and ReOrderSN=D+1. ReOrderSN may refer to or indicate the sequence number value of a data packet that triggered the packet reordering timer.

At block 716, M(X) may be defined to correspond to a maximum SN value of a data packet for either RAT link A or RAT link B stored in the reordering buffer (max {SN of PDU from link X in reordering buffer}). Based on this definition, the packet reordering timer (ReOrderT) may be stopped for at least one of the following conditions: when the SN value of the last received data packet is equal to the sequence number value of a data packet that triggered the packet reordering timer (R(X)==ReOrderSN), when the packet reordering timer is equal to the packet reordering threshold (ReOrderMax) (ReOrderT=ReOrderMax), or when the minimum of the maximum SN value of data packet for either RAT link A or RAT link B is equal to or greater than the SN value of a data packet that triggered the packet reordering timer (min{M(A), M(B)}>=ReOrderSN) when both RAT links A and B deliver data packets in ascending sequence order. In this example, ReOrderMax may refer to or may indicate a maximum or largest value of the packet reordering timer. ReOrderMax may be adjustable, that is, it may be increased or decreased under different conditions.

At block 718, the largest PDCP SN value delivered to upper layers entities may be set to a maximum SN value of the data packets stored in the reordering buffer (D=max {Y: All data packets (y) with SN value such that ReOrderSN<=y<=Y are in the reordering buffer}) to deliver the data packets that arrived in-order after the data packet which caused ReOrderSN, even if this data packet was received successfully.

At block 720, data packets with a SN value less than that of D (SN<=D) in the reordering buffer may be delivered to an upper layer entity (e.g., IP layer entity).

At block 722, when largest PDCP SN value delivered to the upper layers entities is less than the maximum of either RAT link A or RAT link B (D<max{M(A), M(B)}), the packet reordering timer may be started (e.g., activated) by setting ReOrderT=0 and ReOrderSN=D+1.

Figure 8:
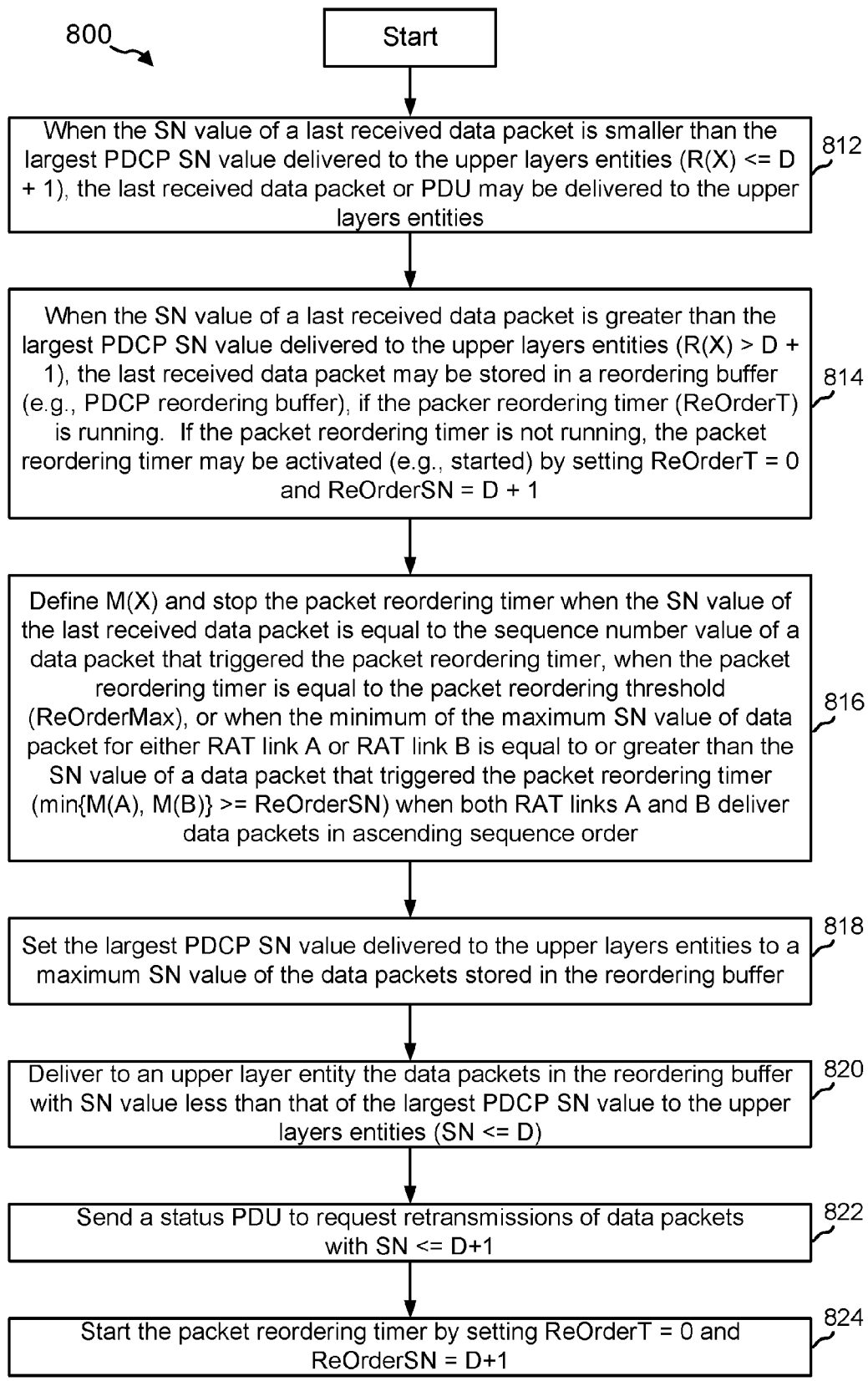
FIG. 8 is a flowchart illustrating another method for handling aggregation at a packet convergence entity in accordance with an aspect of the present disclosure.

FIG. 8 is a flowchart illustrating another method 800 for handling aggregation at packet convergence entity (e.g., PDCP layer entity) in accordance with an aspect of the present disclosure. Some or all of the method 800 may be implemented by the UEs, eNodeBs, base stations, components, and/or devices of FIG. 1, FIG. 2, FIG. 3, FIG. 4A, FIG. 4B, FIG. 4C, FIG. 5, FIG. 6, FIG. 9, FIG. 10, FIG. 11, FIG. 12, and/or FIG. 13. Some or all of the method 800 may correspond to the third set of actions described above.

At block 812, when the SN value of a current data packet is smaller than the largest PDCP SN value delivered to the upper layers entities (R(X)<=D+1), the current data packet or PDU may be delivered to the upper layers entities (e.g., IP entity).

At block 814, when the SN value of a current data packet is greater than the largest PDCP SN value delivered to the upper layers entities (R(X)>D+1), if the packet reordering timer (ReOrderT) is running, the current data packet may be stored in a reordering buffer (e.g., PDCP reordering buffer). On the other hand, if the packet reordering timer is not running, the packet reordering timer may be activated (e.g., started) by setting ReOrderT=0 and ReOrderSN=D+1. ReOrderSN may refer to or indicate the sequence number value that triggered the packet reordering timer.

At block 816, M(X) may be defined to correspond to a maximum SN value of a data packet for either RAT link A or RAT link B stored in the reordering buffer (max {SN of PDU from link X in reordering buffer}). Based on this definition, the packet reordering timer (ReOrderT) may be stopped for at least one of the following conditions: when the SN value of the last received data packet is equal to the sequence number value of a data packet that triggered the packet reordering timer (R(X)==ReOrderSN), when the packet reordering timer is equal to the packet reordering threshold (ReOrderMax) (ReOrderT=ReOrderMax), or when the minimum of the maximum SN value of data packet for either RAT link A or RAT link B is equal to or greater than the SN value of a data packet that triggered the packet reordering timer (min{M(A), M(B)}>=ReOrderSN) when both RAT links A and B deliver data packets in ascending sequence order. In this example, ReOrderMax may refer to or may indicate a maximum or largest value of the packet reordering timer. ReOrderMax may be adjustable, that is, it may be increased or decreased under different conditions.

At block 818, the largest PDCP SN value delivered to upper layers entities may be set to a maximum SN value of the data packets stored in the reordering buffer (D=max {Y: All data packets (y) with SN value such that ReOrderSN<=y<=Y are in the reordering buffer}) to deliver the data packets that arrived in-order after the data packet which caused ReOrderSN, even if this data packet was received successfully.

At block 820, the data packets in the reordering buffer with SN value less than that of the largest PDCP SN value to the upper layers entities (SN<=D) may be delivered to an upper layer entity (e.g., IP layer entity).

At block 822, when the largest PDCP SN value delivered to the upper layers entities is less than a maximum value of RAT links A or B (D<max{M(A), M(B)}), a status PDU may be sent to request retransmissions of data packets with SN<=D+1.

At block 824, the packet reordering timer may be started (e.g., activated) by setting ReOrderT=0 and ReOrderSN=D+1.

In some implementations of the method 800, additional status PDU requests may be used in a manner similar to RLC entity. Note that one assumption may be that the packet errors on link A need not be considered as typically allowed in such situations (e.g., radio link failure (RLF) for LTE).

On the transmitter side, that is, the side (e.g., UE or eNodeB) transmitting the packets for PDCP aggregation, flow controls between the PDCP and both RAT links may be used for optimization since the two RAT links may typically have different transmission performance. The flow control may be based at least in part on the buffer occupancy and/or on transmission (e.g. link data rates) statistics of each RAT link. Flow control may be initiated periodically, may be trigger based on various network parameters, or may be a combination of the two. When several data bearers are present, the PDCP entity of each may also take into account information about the other data bearers. This may be achieved by a scheduler, which may also provide differentiation between the data bearers.

Figure 9:
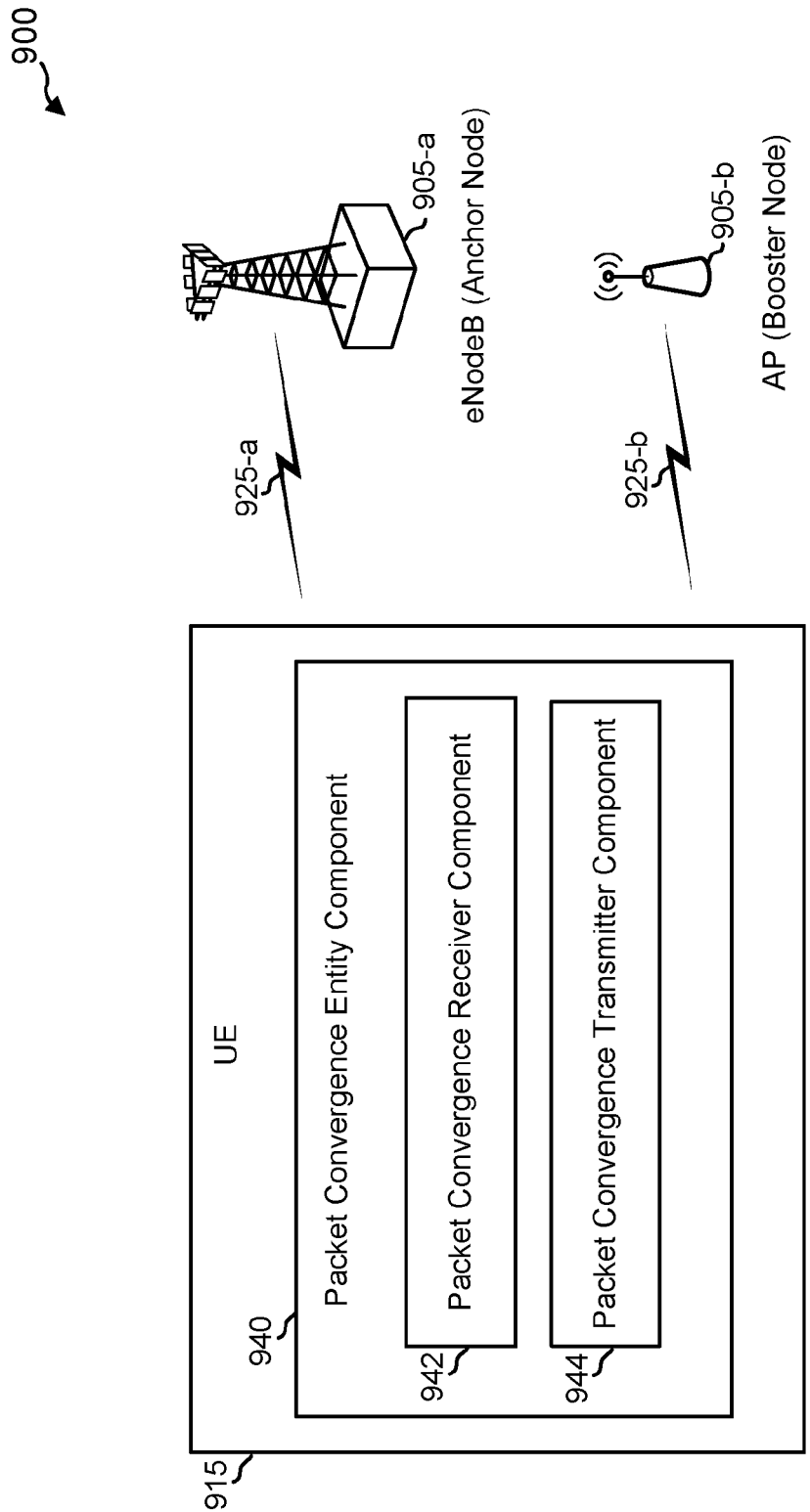
FIG. 9 is a block diagram conceptually illustrating an example of a UE and components configured in accordance with an aspect of the present disclosure.

FIG. 9 is a block diagram conceptually illustrating an example of a UE 915 and components configured in accordance with an aspect of the present disclosure. A base station/eNodeB 905-*a* (anchor node), an AP 905-*b* (booster node), and the UE 915 of diagram 900 may be, respectively, one of the base stations/eNodeBs, APs, and UEs as described herein in various Figures. The eNodeB 905-*a* and the UE 915 may communicate over communications link 925-*a*. The AP 905-*b* and the UE 915 may communicate over communications link 925-*b*. Each of the communications links 925-*a*, 925-*b* may be an example of the communications links 125 of FIG. 1.

The UE 915 may include a packet convergence entity component 940, which may include a packet convergence receiver component 942 and a packet convergence transmitter component 944.

The packet convergence receiver component 942 may be configured to communicate data packets with a first RAT link and a second RAT link, to identify from which of the first and second RAT links a data packet is received, to monitor a sequence number value of each data packet received by the packet convergence receiver component 942 based at least in part on the respective RAT link through which the data packet is received, to perform one or more actions when the sequence number values of multiple data packets received by the packet convergence receiver component 942 are out of order, and to exchange packet status information in response to one or more events on one or both of the first RAT link and the second RAT link. In some implementations, the first RAT link includes a WWAN link (e.g., LTE or UMTS link), the second RAT link includes a WLAN link (e.g., Wi-Fi link), and the packet convergence entity includes a PDCP entity (e.g., LTE PDCP 616).

The packet convergence receiver component 942 may be configured to communicate data packets with a first RAT link and a second RAT link, to determine whether each of the data packets is received from the first RAT link and the second RAT link, to monitor a sequence number value of each of the data packets received on the first RAT link and the second RAT link, to determine whether the sequence number values of the data packets received on the first RAT link and the second RAT link are out of order, to perform one or more actions based at least in part on the determination that the sequence number values of the received data packets are out of order, and to exchange packet status information in response to one or more events on one or both of the first RAT link and the second RAT link.

The one or more actions performed by the packet convergence receiver component 942 may include sending a current one of the data packets to an upper layer entity when a packet reordering timer is currently not running and when the sequence number value of the current received (e.g., last received) packet is less than or equal to an expected sequence number value, when the expected sequence number value is one more than a largest SN value of a data packet delivered to the upper layer entity.

The one or more actions performed by the packet convergence receiver component 942 may include starting a packet reordering timer (see e.g., packet reordering timer 1157 in FIG. 11) if it is not running when a data packet with a sequence number value greater than an expected sequence number value is received by the packet convergence receiver component 942, where the expected sequence number value is one more than a largest sequence number value of a data packet delivered to an upper layer entity. The one or more actions performed by the packet convergence receiver component 942 may include stopping the packet reordering timer when a predefined time is reached.

The one or more actions performed by the packet convergence receiver component 942 may include stopping a packet reordering timer when both the first and second RAT links are configured to deliver data packets in ascending order of sequence number values, and when a minimum value of the sequence numbers received on each link is greater than or equal to a sequence number value of a data packet that when received started the packet reordering timer.

The one or more actions performed by the packet convergence receiver component 942 may include sending at least a portion of the data packets received by the packet convergence receiver component 942 to an upper layer entity, the at least a portion of the data packets including those data packets with a sequence number value that is less than a sequence number value of a data packet that when received started a packet reordering timer that is now stopped.

The one or more actions performed by the packet convergence receiver component 942 may include sending at least a portion of the data packets received by the packet convergence receiver component 942 to an upper layer entity, the at least a portion of the data packets comprising those data packets with a sequence number value less than or equal to an upper bound and greater than or equal to a sequence number value of a data packet that when received started a packet reordering timer that is now stopped. The upper bound may be a largest sequence number value of the data packet received in sequence number value order after the data packet that when received started the packet reordering timer that is now stopped. The upper bound may be a largest sequence number value of the data packets received after the data packet that when received started the packet reordering timer that is now stopped. The upper bound may be a minimum of a largest sequence number value of the data packets received on the first RAT link and a largest SN value of the data packets received on the second RAT link after the data packet that when received started the packet reordering timer that is now stopped.

The one or more actions performed by the packet convergence receiver component 942 may include restarting a packet reordering timer when a data packet determined to be missing has a sequence number value greater than a largest sequence number value of a data packet delivered from the packet convergence receiver component 942 to an upper layer entity.

The one or more actions performed by the packet convergence receiver component 942 may include stopping a packet reordering a timer before a predefined time for expiration of the packet reordering timer when a data packet that started the packet reordering timer is determined to be missing.

The one or more actions performed by the packet convergence receiver component 942 may include determining which data packets are missing when both the first and second RAT links are configured to deliver data packets to the packet convergence receiver component 942 in ascending order of sequence number values.

The one or more actions performed by the packet convergence receiver component 942 may include sending at least a portion of the data packets received by the packet convergence receiver component 942 to an upper layer entity, where the at least a portion of the data packets include data packets with smaller sequence number values than those of data packets determined to be missing, and where retransmission of those data packets determined to be missing is not requested.

The one or more actions performed by the packet convergence receiver component 942 may include identifying one or more data packets as missing after a predefined time of a packet retransmission timer is reached, and requesting retransmission of the one or more data packets that are missing or nor received.

The one or more actions performed by the packet convergence receiver component 942 may include sending a status report indicating which data packets have been received by the packet convergence receiver component 942 and which data packets are missing, the status report may be sent when a missing data packet is detected on one of the first and second RAT links.

The packet convergence receiver component 942 may be configured to receive an indication from each of the first and second RAT links to enable the packet convergence receiver component 942 to identify from which of the first and second RAT links a data packet is received by the packet convergence receiver component 942.

The one or more actions performed by the packet convergence receiver component 942 may include determining missing data packets based on a minimum sequence number value received on both the first and second RAT links that is greater than a largest sequence value of a data packet delivered from the packet convergence receiver component 942 to an upper layer entity when both the first and second RAT links are configured to deliver data packets to the packet convergence receiver component 942 in ascending order of sequence number values.

The packet convergence receiver component 942 may be configured to handle receiving data packets through the first RAT link based on a separate first sequence of in-order sequence number values and receiving the data packets through the second RAT link based on a separate second sequence of in-order sequence number values, where the first and second sequences of sequence number values are used to identify from which of the first and second RAT links and in which order each data packet is received by the packet convergence receiver component 942.

The packet convergence receiver component 942 may be configured to send a retransmission request through the second RAT link when it is determined that a data packet is missing on the first RAT link.

The packet convergence receiver component 942 may be configured to send a retransmission request through either of the first and second RAT links when it is determined that a data packet is missing on the second RAT link.

The packet convergence receiver component 942 may be configured to send a packet convergence entity status report to request retransmission of one or more data packets determined missing.

The packet convergence receiver component 942 may be configured to periodically send a packet convergence entity status report.

The packet convergence receiver component 942 may be configured to receive a status request from a transmitter of the data packets and send a packet convergence entity status report for the data packets received and for data packets determined to be missing in response to the to the status request.

The packet convergence receiver component 942 may be configured to handle data packets received from the first and second RAT links corresponding to a single data bearer.

The packet convergence receiver component 942 may be configured to exchange a status between the packet convergence receiver component 942 and a source of data packets received by the packet convergence receiver component 942 in response to the one or more events corresponding to a respective RAT link of the source. The exchanging of status may be initiated by the packet convergence receiver component 942 or the source of the data packets.

The packet convergence receiver component 942 may be configured to be responsive to the one or more events on one or both of the first RAT link and the second RAT link, where the one or more events include a Radio Link Failure on the respective RAT link.

The packet convergence receiver component 942 may be configured to be responsive to the one or more events on one or both of the first RAT link and the second RAT link, where the one or more events include a deactivation or disassociation of a user of the packet convergence receiver component 942 from the first RAT link or the second RAT link.

The packet convergence receiver component 942 may be configured to be responsive to the one or more events on one or both of the first RAT link and the second RAT link, where the one or more events include a radio link quality on the respective RAT link reaching above or below a threshold value.

The packet convergence receiver component 942 may be configured to be responsive to the one or more events on one or both of the first RAT link and the second RAT link, where the one or more events include having a number of unsuccessful packet transmissions on the respective RAT link reach a threshold value.

The packet convergence transmitter component 944 may be configured to transmit data packets to a wireless communications device (e.g., UE, eNodeB) through a first RAT link and a second RAT link, where each of the data packets has an assigned sequence number value for data packet aggregation at a packet convergence entity within the wireless communications device. The packet convergence entity within the wireless communications device may be substantially similar (e.g., have substantially the same functionality) to the packet convergence entity component 940 of FIG. 9. The packet convergence transmitter component 944 may be configured to perform flow control over the first and second RAT links, where the flow control is configured to prevent one or both of underflow and overflow of buffers for each of the first and second RAT links. In some implementations, the first RAT link includes a WWAN link (e.g., LTE or UMTS link), the second RAT link includes a WLAN link (e.g., Wi-Fi link), and the packet convergence entity includes a PDPC entity (e.g., LTE PDCP 616).

In some implementations, the packet convergence transmitter component 944 may be configured to perform flow control by identifying one or both of a buffer status and performance statistics for each of the first and second RAT links. The packet convergence transmitter component 944 may be configured to assign a first in-order sequence of sequence number values to the data packets transmitted through the first RAT link and a second in-order sequence of sequence number values to the data packets transmitted through the second RAT link. The packet convergence transmitter component 944 may be configured to receive a status report request from the packet convergence entity in the wireless communications device when the packet convergence entity determines that a data packet is missing from whichever of the first and second RAT links provides in-sequence delivery, and transmit a status report to the wireless communications device in response to the status report request. The packet convergence transmitter component 944 may be configured to receive a status report request from the packet convergence entity in the wireless communications device when the packet convergence entity determines that transmission performance on either of the first and second RAT links is less than a threshold, and transmitting a status report to the wireless communications device in response to the status report request. The transmission performance may be based at least in part on a number of data packets transmitted over the respective link during a predefined time interval.

Figure 10:
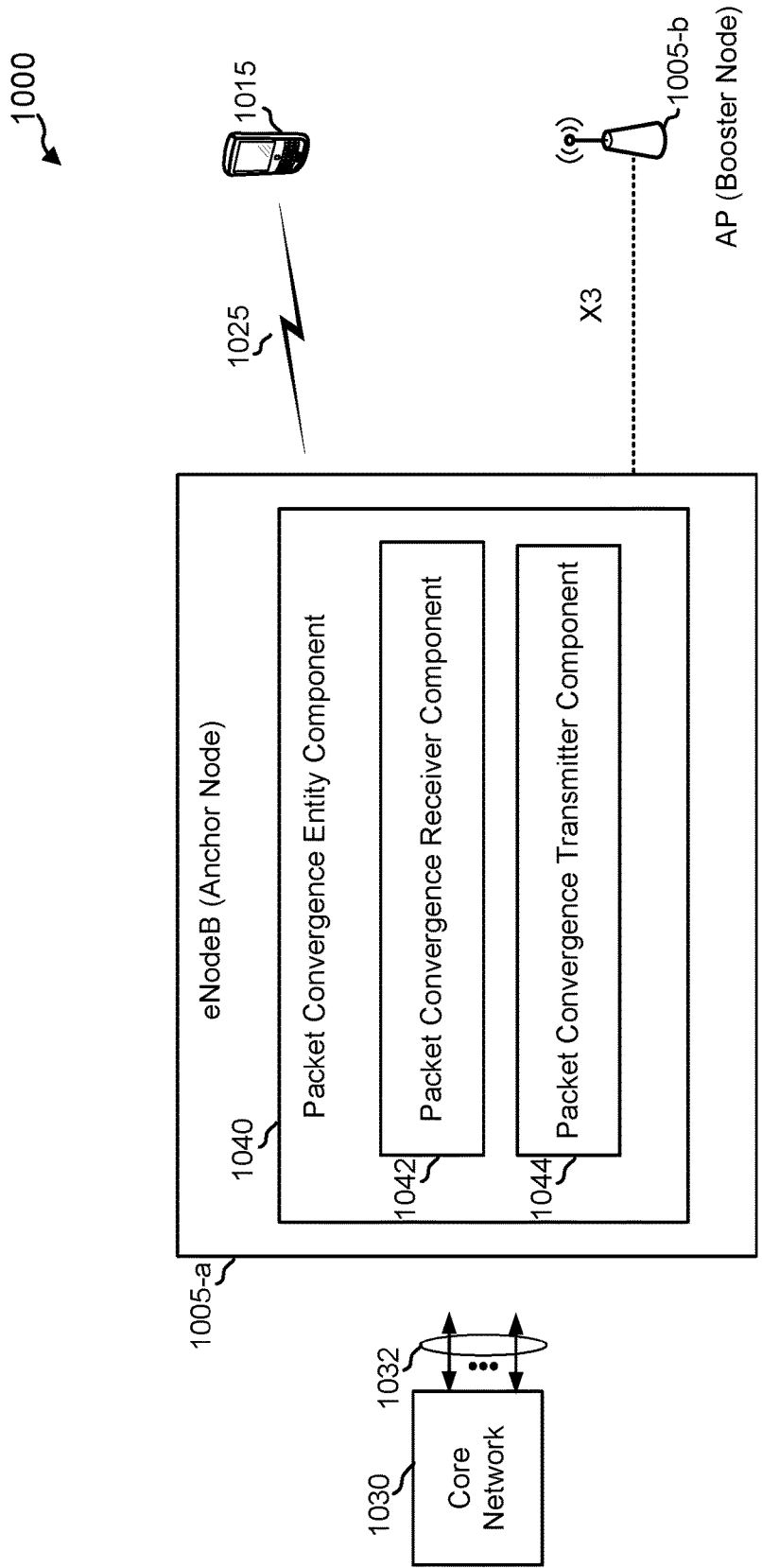
FIG. 10 is a block diagram conceptually illustrating an example of an eNodeB and components configured in accordance with an aspect of the present disclosure.

FIG. 10 is a block diagram conceptually illustrating an example of an eNodeB 1005-*a* and components configured in accordance with an aspect of the present disclosure. A UE 1015, the base station/eNodeB 1005-*a* (anchor node), and an AP 1005-*b* (booster node) of diagram 1000 may be, respectively, one of the base stations/eNodeBs, APs, and UEs as described in various Figures. Similarly, a core network 1030 and first backhaul links 1032 may correspond to those shown in FIG. 1. The eNodeB 1005-*a* and the UE 1015 may communicate over communications link 1025. The eNodeB 1005-*a* and the AP 1005-*b* may communicate over an interface X3. The communications link 1025 may be an example of the communications links 125 of FIG. 1 and the interface X3 may be substantially similar to the one shown in FIG. 4C.

The eNodeB 1005-*a* may include a packet convergence entity component 1040, which may include a packet convergence receiver component 1042 and a packet convergence transmitter component 1044. The packet convergence receiver component 1042 may perform, from the perspective of the eNodeB 1005-*a*, some or all of the functions described above with respect to the packet convergence receiver component 942 of FIG. 9. Similarly, the packet convergence transmitter component 1044 may perform, from the perspective of the eNodeB 1005-*a*, some or all of the functions described above with respect to the packet convergence transmitter component 944 of FIG. 9.

Figure 11:
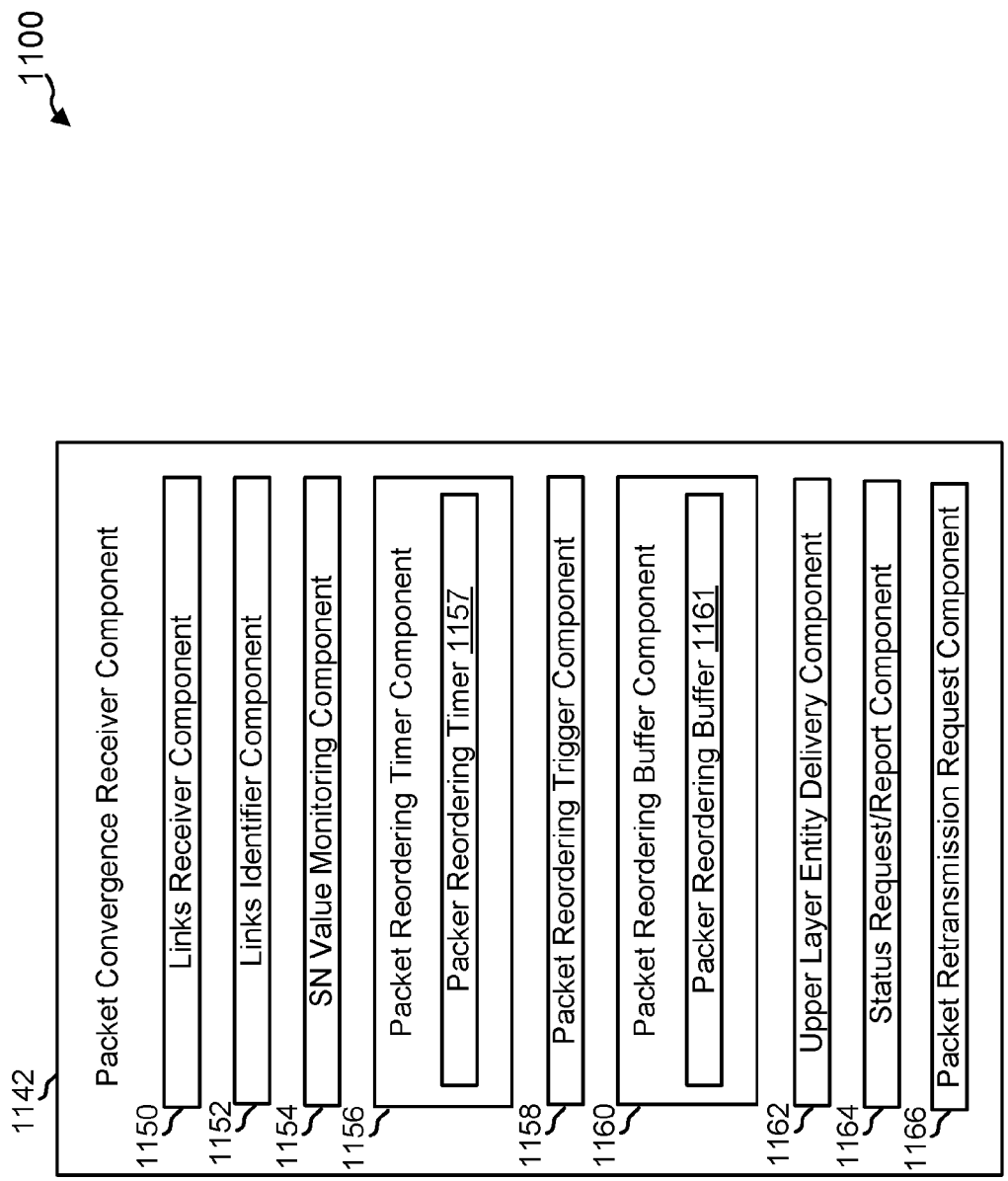
FIG. 11 is a block diagram conceptually illustrating an example of a packet convergence receiver component and subcomponents configured in accordance with an aspect of the present disclosure.

FIG. 11 is a block diagram conceptually illustrating an example of a packet convergence receiver component 1142 and subcomponents configured in accordance with an aspect of the present disclosure. The packet convergence receiver component 1142 may be an example of the packet convergence receiver components 942 and 1042 of FIG. 9 and FIG. 10, respectively.

The packet convergence receiver component 1142 may include various subcomponents such as a links receiver component 1150, a links identifier component 1152, a sequence number (SN) value monitoring component 1154, a packet reordering timer component 1156, a packet reordering trigger component 1158, a packet reordering buffer component 1160, an upper layer entity delivery component 1162, a status request/report component 1164, and a packet retransmission request component 1166.

The links receiver component 1150 may be configured to handle various aspects described herein for receiving and/or processing data packets over two or more communications links (e.g., RAT links).

The links identifier component 1152 may be configured to handle various aspects described herein for identifying, determining, and/or processing over which link each data packet is received.

The SN value monitoring component 1154 may be configured to handle various aspects described herein for monitoring, tracking, and/or processing the order in which data packets are received based on the sequence number values. The SN value monitoring component 1154 may be configured to handle different and/or separate sequence number sequences for different links.

The packet reordering timer component 1156 may be configured to handle various aspects described herein for starting, stopping, resetting, and/or processing a packet reordering timer. The packet reordering timer component 1156 may include a packet reordering timer 1157.

The packet reordering trigger component 1158 may be configured to handle various aspects described herein for triggering and/or processing events associated with a packet reordering timer. The events may include events associated with, for example, ReOrderMax, ReOrderT, and/or ReOrderSN as described above in, for example, FIG. 7 and/or FIG. 8.

The packet reordering buffer component 1160 may be configured to handle various aspects described herein for storing, buffering, and/or processing data packets for subsequent delivery to an upper layer entity. The packet reordering buffer component 1160 may include a packet reordering buffer 1161.

The upper layer entity delivery component 1162 may be configured to handle various aspects described herein for delivering, sending, and/or processing data packets to be provided to an upper layer entity.

The status request/report component 1164 may be configured to handle various aspects described herein for receiving, exchanging, and/or processing status requests, and/or for transmitting, exchanging, and/or processing status reports.

The packet retransmission request component 1166 may be configured to handle various aspects described herein for requesting and/or processing retransmissions of data packets determined to be missing (e.g., lost or not received).

Figure 12:
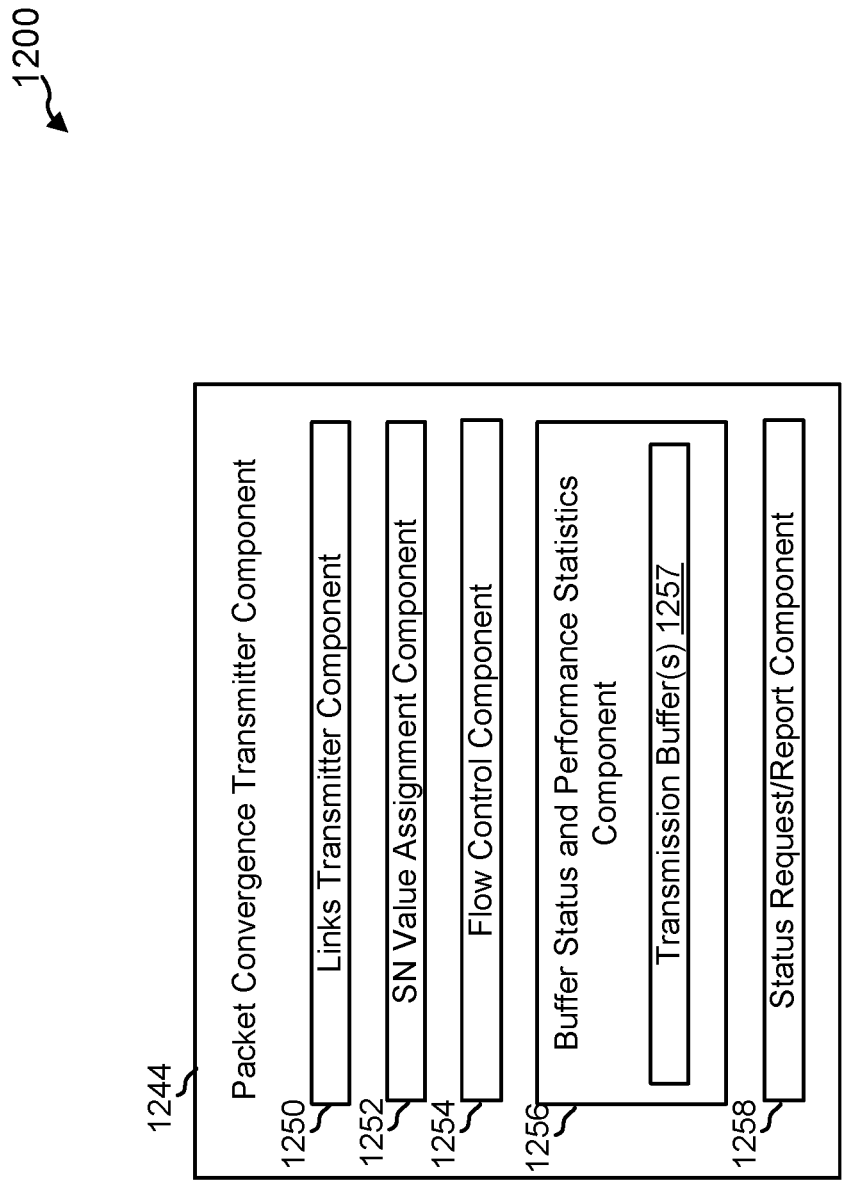
FIG. 12 is a block diagram conceptually illustrating an example of a packet convergence transmitter component and subcomponents configured in accordance with an aspect of the present disclosure.

FIG. 12 is a block diagram conceptually illustrating an example of a packet convergence transmitter component 1244 and subcomponents configured in accordance with an aspect of the present disclosure. The packet convergence transmitter component 1244 may be an example of the packet convergence transmitter components 944 and 1044 of FIG. 9 and FIG. 10, respectively.

The packet convergence transmitter component 1244 may include various subcomponents such as a links transmitter component 1250, a sequence number (SN) value assignment component 1252, a flow control component 1254, a buffer status and performance statistics component 1256, and a status request/report component 1258.

The links transmitter component 1250 may be configured to handle various aspects described herein for transmitting and/or processing data packets over two or more communications links.

The SN value assignment component 1252 may be configured to handle various aspects described herein for assigning and/or processing sequence number values associated with data packets (e.g., PDUs). The SN value assignment component 1252 may be configured to assign different and/or separate sequences of sequence number values to data packets transmitted over different communications links (e.g., RAT links).

The flow control component 1254 may be configured to handle various aspects described herein for managing, controlling, and/or processing the flow in each of the communication links through which data packets are being transmitted. The flow control component 1254 may be configured to prevent overflow and/or underflow of buffers for different communications links.

The buffer status and performance statistics component 1256 may be configured to handle various aspects described herein for identifying current conditions and/or processing status of transmission buffers, and/or for determining performance statistics associated with the transmission of data packets. The buffer status and performance statistics component 1256 may provide information to the flow control component 1254 to perform flow control. In one aspect, the buffer status and performance statistics component 1256 may include one or more transmission buffers 1257.

The status request/report component 1258 may be configured to handle various aspects described herein for receiving and/or processing status requests, and/or for transmitting and/or processing status reports.

The components and/or subcomponents described above with respect to the UE 915 of FIG. 9, the eNodeB 1005-a of FIG. 10, the packet convergence receiver component 1142 of FIG. 11, and/or the packet convergence transmitter component 1244 of FIG. 12 may be implemented in software, hardware, or a combination of software and hardware. Moreover, at least part of the functions of two or more of the components and/or subcomponents may be combined into a single component or single subcomponent and/or at least part of the function(s) of one component or subcomponent may be distributed among multiple components and/or subcomponents. The components and/or subcomponents of a single device (e.g., UE 915) may be in communication with one or more components and/or subcomponents of the same device.

Figure 13:
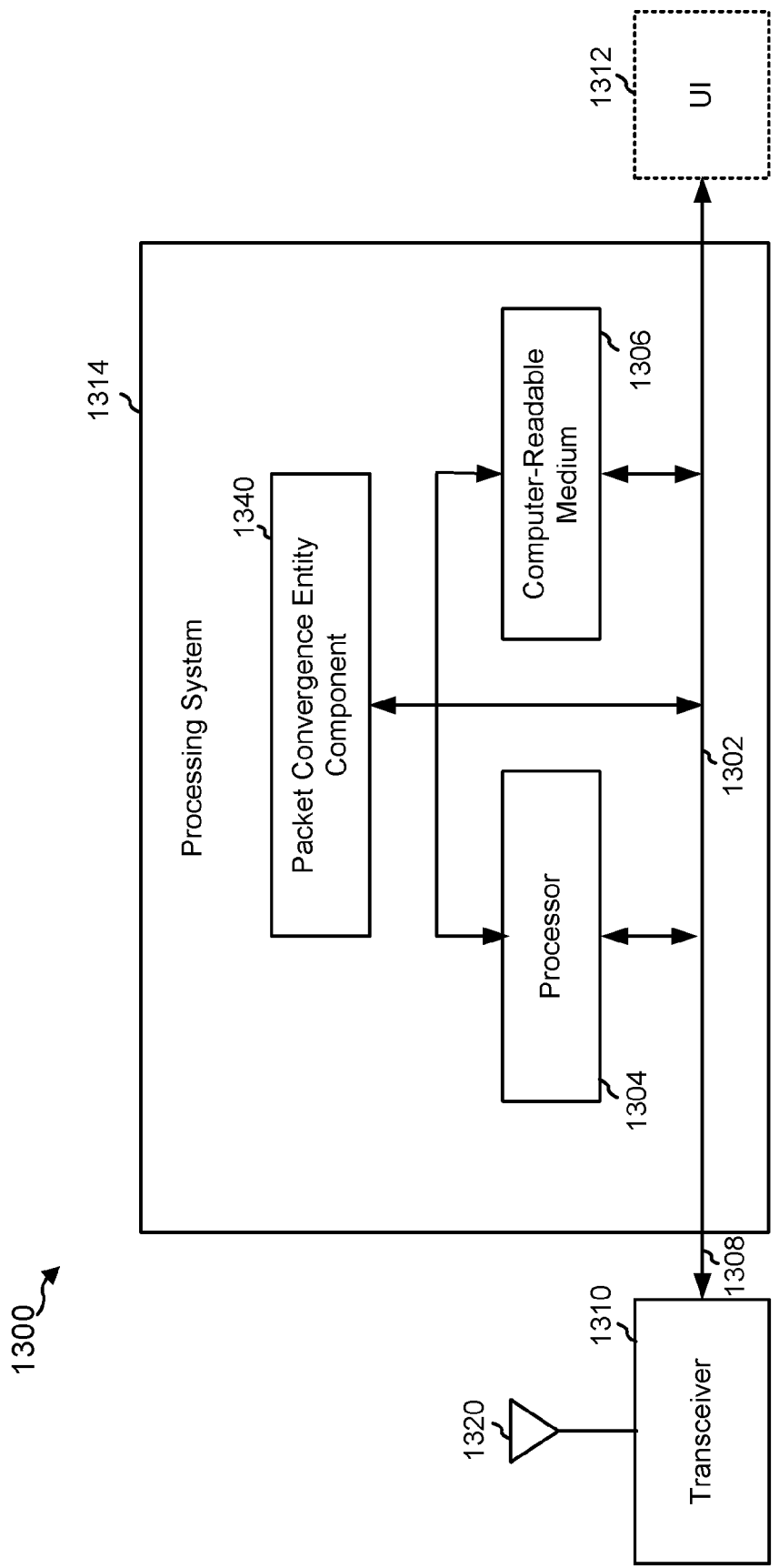
FIG. 13 is a block diagram conceptually illustrating an example hardware implementation for an apparatus employing a processing system configured in accordance with an aspect of the present disclosure.

FIG. 13 is a block diagram conceptually illustrating an example hardware implementation for an apparatus 1300 employing a processing system 1314 configured in accordance with an aspect of the present disclosure. The processing system 1314 includes a packet convergence entity component 1340. In one example, the apparatus 1300 may be the same or similar, or may be included with one of the eNodeBs described in various Figures. In such example, the packet convergence entity component 1340 may correspond to, for example, the packet convergence entity component 1040. In another example, the apparatus 1300 may be the same or similar, or may be included with one of the UEs described in various Figures. In such example, the packet convergence entity component 1340 may correspond to, for example, the packet convergence entity component 940. In this example, the processing system 1314 may be implemented with a bus architecture, represented generally by the bus 1302. The bus 1302 may include any number of interconnecting buses and bridges depending on the specific application of the processing system 1314 and the overall design constraints. The bus 1302 links together various circuits including one or more processors (e.g., central processing units (CPUs), microcontrollers, application specific integrated circuits (ASICs), field programmable gate arrays (FPGAs)) represented generally by the processor 1304, and computer-readable media, represented generally by the computer-readable medium 1306. The bus 1302 may also link various other circuits such as timing sources, peripherals, voltage regulators, and power management circuits, which are well known in the art, and therefore, will not be described any further. A bus interface 1308 provides an interface between the bus 1302 and a transceiver 1310, which is connected to one or more antennas 1320 for receiving or transmitting signals. The transceiver 1310 and the one or more antennas 1320 provide a mechanism for communicating with various other apparatus over a transmission medium (e.g., over-the-air). Depending upon the nature of the apparatus, a user interface (UI) 1312 (e.g., keypad, display, speaker, microphone, joystick) may also be provided.

The processor 1304 is responsible for managing the bus 1302 and general processing, including the execution of software stored on the computer-readable medium 906. The software, when executed by the processor 1304, causes the processing system 1314 to perform the various functions described herein for any particular apparatus. The computer-readable medium 1306 may also be used for storing data that is manipulated by the processor 1304 when executing software. The packet convergence entity component 1340 as described above may be implemented in whole or in part by processor 1304, or by computer-readable medium 1306, or by any combination of processor 1304 and computer-readable medium 1306.

In an aspect, the computer-readable medium 1306 may include code executable by the processor 1304 and/or the packet convergence entity component 1340, where the code may include code for causing the processing system 1314 to communicate data packets, by a packet convergence entity, with a first RAT link and a second RAT link, code for causing the processing system 1314 to determine whether each of the data packets is received from the first RAT link and the second RAT link, code for causing the processing system 1314 to monitor a sequence number value of each of the data packets received on the first RAT link and the second RAT link, code for causing the processing system 1314 to determine whether the sequence number values of the data packets received on the first RAT link and the second RAT link are out of order, code for causing the processing system 1314 to perform one or more actions based at least in part on the determination that the sequence number values of the received data packets are out of order, and code for causing the processing system 1314 to exchange packet status information in response to one or more events on one or both of first RAT link and the second RAT link.

Figure 14:
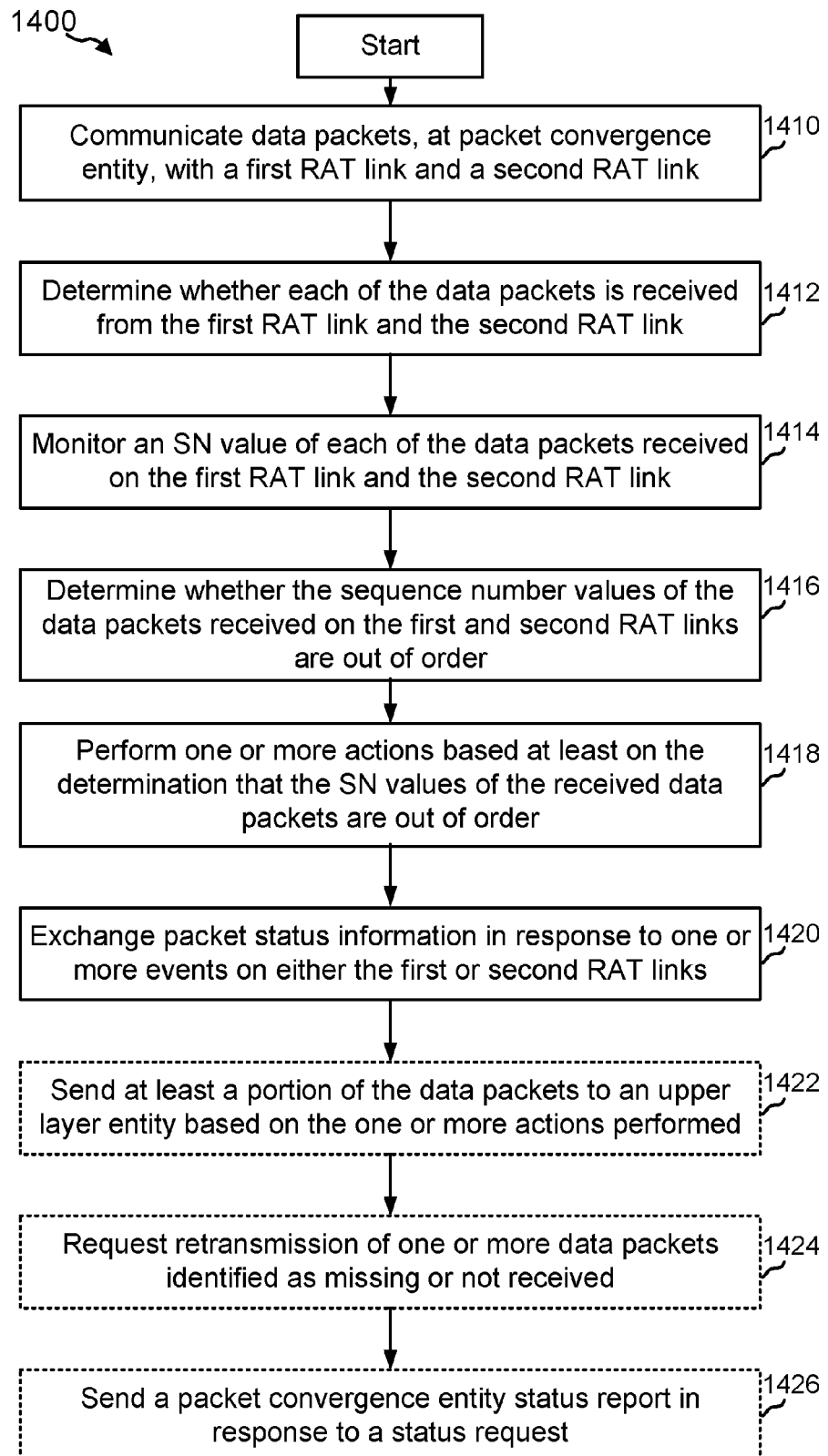
FIG. 14 is a flowchart illustrating a method for aggregation of WWAN and WLAN data at a packet convergence entity in a receiver in accordance with an aspect of the present disclosure.

FIG. 14 is a flowchart illustrating a method 1400 for aggregation of WWAN and WLAN data at a packet convergence entity (e.g., packet convergence entity components 940, 1040, 1340) in a receiver in accordance with an aspect of the present disclosure. Some or all of the method 1400 may be implemented by the UEs, eNodeBs, base stations, components, and/or devices of FIG. 1, FIG. 2, FIG. 3, FIG. 4A, FIG. 4B, FIG. 4C, FIG. 5, FIG. 6, FIG. 9, FIG. 10, FIG. 11, and/or FIG. 13.

At block 1410, a packet convergence entity (e.g., PDPC entity) communicates data packets (e.g., PDUs) with a first RAT link (e.g., WWAN link) and a second RAT link (e.g., WLAN or Wi-Fi link). For example, the links receiver component 1150 (FIG. 11) may communication data packets with multiple RAT links.

At block 1412, the packet convergence entity determines whether each data packet is received from the first RAT link and the second RAT link. For example, the links identifier component 1152 (FIG. 11) may identify the link that is the source of a data packet.

At block 1414, the packet convergence entity monitors a sequence number value of each of the data packets received from the first RAT link and the second RAT link. For example, the SN value monitoring component 1154 (FIG. 11) may monitor sequence number values of data packets.

At block 1416, the packet convergence entity determines whether the sequence number values of the data packets received on the first RAT link and the second RAT link are out of order. For example, the SN value monitoring component 1154 (FIG. 11) may determine whether data packets are in order or out of order.

At block 1418, the packet convergence entity performs one or more actions based at least in part on the determination that the sequence number values of the received data packets are out of order. For example, the upper layer entity delivery component 1162 (FIG. 11) may perform one or more of actions based on the order in which the data packets are received. In another aspect, one or more other components of the packet convergence receiver component 1142 (FIG. 11) may also be used to perform the one or more actions. For example, the packet reordering timer component 1156, the packet reordering trigger component 1158, and/or the packet reordering buffer component 1160 may be used to perform the one or more actions.

At block 1420, the packet convergence entity exchanges packet status information (e.g., with a UE or an eNodeB) in response to one or more events on one or both of the first RAT link and the second RAT link. For example, the status request/report component 1164 (FIG. 11) may exchange packet status information with a remote device when certain events occur in the first and/or second RAT link.

Optionally at block 1422, the packet convergence entity sends at least a portion of the data packets to an upper layer entity based on the one or more actions performed.

Optionally at block 1424, the packet convergence entity requests retransmission of one or more data packets identified as missing (e.g., not received).

Optionally at block 1426, the packet convergence entity sends a packet convergence entity status report in response to a status request.

The various optional aspects described above with respect to method 1400 may be performed by, for example, one or more of the components in the packet convergence receiver component 1142 (FIG. 11).

Figure 15:
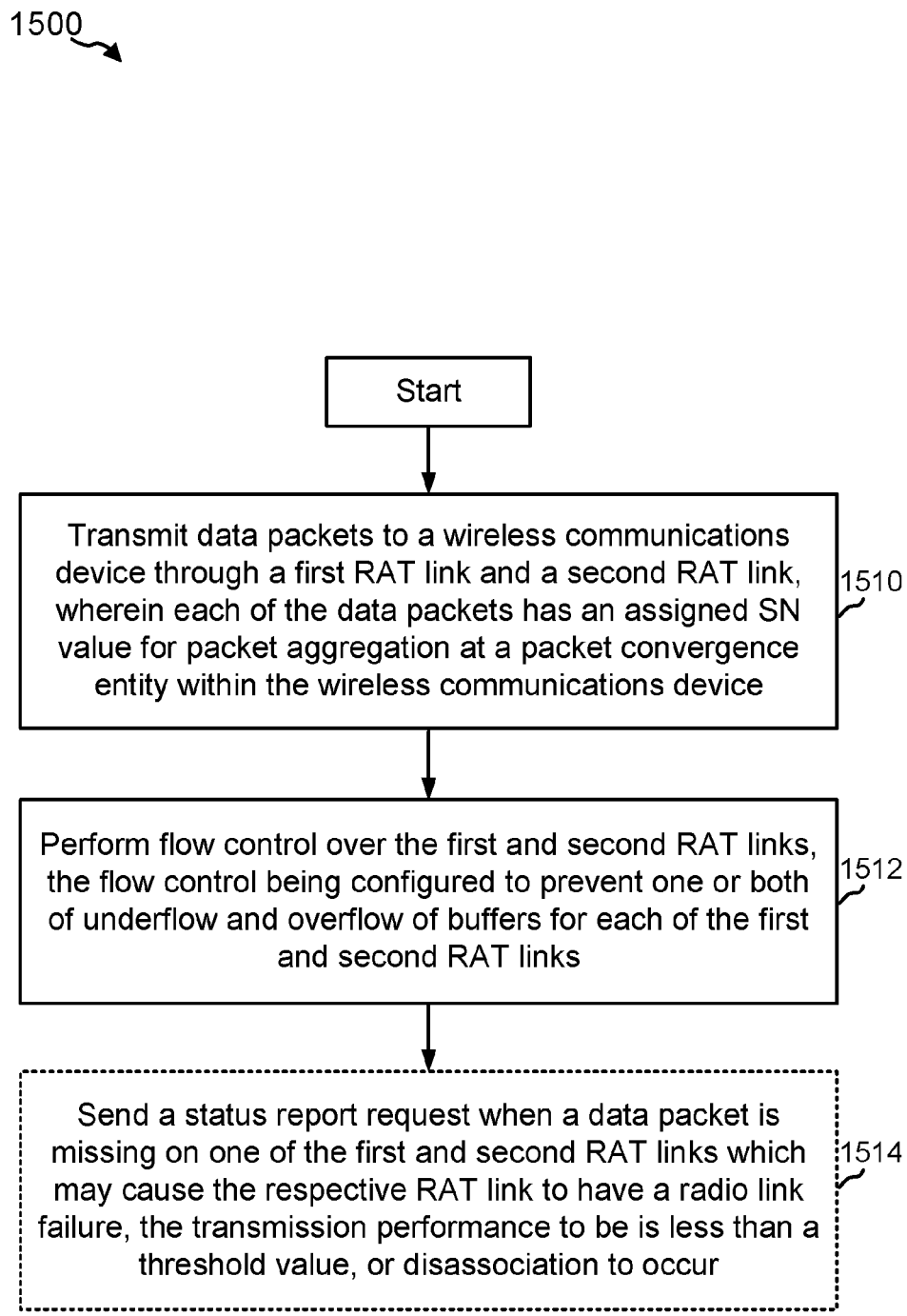
FIG. 15 is a flowchart illustrating a method for aggregation of WWAN and WLAN data at a packet convergence entity in a transmitter in accordance with an aspect of the present disclosure.

FIG. 15 is a flowchart illustrating a method 1500 for aggregation of WWAN and WLAN data at a PDCP layer in a transmitter in accordance with an aspect of the present disclosure. Some or all of the method 1500 may be implemented by the UEs, eNodeBs, base stations, components, and/or devices of FIG. 1, FIG. 2, FIG. 3, FIG. 4A, FIG. 4B, FIG. 4C, FIG. 5, FIG. 6, FIG. 9, FIG. 10, FIG. 12, and/or FIG. 13.

At block 1510, packets are transmitted to a wireless communications device (e.g., UE 115) through a first RAT link (e.g., WWAN link) and a second RAT link (e.g., WLAN or Wi-Fi link), where each of the packets has an assigned sequence number value for packet aggregation at a packet convergence entity (e.g., PDCP entity) within the wireless communications device. For example, the links transmitter component 1250 (FIG. 12) may transmit packets having an assigned sequence number value for packet aggregation.

At block 1512, flow control is performed (e.g., by packet convergence transmitter components 944, 1044, 1244) over the first and second RAT links, where the flow control is configured to prevent one or both of underflow and overflow of buffers for each of the first and second RAT links. For example, the flow control component 1254 (FIG. 12) may be used to prevent underflow and/or overflow.

Optionally at block 1514, a status report request is sent when that a data packet is missing (e.g., lost or not received) on one of the first and second RAT links which may cause the respective RAT link to have radio link failure, the transmission performance to be less than a threshold value, or a disassociation to occur. For example, the status request/report component 1258 may be used to sends status requests associated with missing data packets.

The various concepts presented throughout this disclosure may be implemented across a broad variety of telecommunication systems, network architectures, and communication standards.

The features described above with respect to FIG. 7, FIG. 8, FIG. 14, and FIG. 15 are provided by way of illustration and not of limitation. For example, one or more of the aspects described in each of methods 700, 800, 1400, and/or 1500 may be combined to produce variations in those methods. Moreover, those aspects of methods 700, 800, 1400, and/or 1500 referred to as optional may be implemented independently, that is, different optional aspects may be implemented independently from each other.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but it is to be accorded the widest scope consistent with the principles and novel features disclosed herein.

What is claimed is:

1. A method for aggregating data in wireless communications, the method comprising:
    communicating data packets, by a packet convergence entity, with a first radio access technology (RAT) link comprising a wireless wide area network (WWAN) link and a second RAT link comprising a wireless local area network (WLAN) link;
    receiving, at the packet convergence entity from each of the first RAT link and the second RAT link, an indication to enable the packet convergence entity to identify which of the first and second RAT links each of the data packets is received by the packet convergence entity;
    determining, at the packet convergence entity, which data packets are received from the first RAT link and the second RAT link based on the indications from the first RAT link and the second RAT link;
    monitoring, at the packet convergence entity, a sequence number value of each of the data packets received on the first RAT link and the second RAT link;
    determining, at the packet convergence entity, whether one or more data packets are missing based on the monitored sequence number values of the first RAT link and the second RAT link; and
    sending, by the packet convergence entity, a status report in response to one or more events on one or both of the first RAT link and the second RAT link.

2. The method of claim 1, wherein the status report indicates which data packets have been received and which data packets are missing.

3. The method of claim 1, wherein the packet convergence entity comprises a packet data convergence protocol (PDCP) entity.

4. The method of claim 2, wherein:
    the WWAN link comprises a Long Term Evolution (LTE) link or a Universal Mobile Telecommunication System (UMTS) link, and
    the WLAN link comprises a Wi-Fi link.

5. The method of claim 1, wherein the one or more events is determining that a data packet is missing.

6. The method of claim 1, wherein determining whether one or more data packets are missing is based on a minimum sequence number value received on both the first RAT link and the second RAT link being greater than a largest sequence value, of a received data packet when the first RAT link and second RAT link are configured to transmit data packets in ascending order of sequence number values.

7. The method of claim 1, wherein the data packets received on the first RAT link are based on the indications comprising a separate first sequence number values of in-order sequence number values and the data packets received on the second RAT are based on the indications comprising a separate second sequence number values of in-order sequence number values, wherein the first sequence number values and the second sequence number values are used to identify from which of the first RAT link and the second RAT link a data packet is received from.

8. The method of claim 1, further comprising sending, by the packet convergence entity, a retransmission request through the second RAT link in response to determining that a data packet is missing from the first RAT link.

9. The method of claim 1, further comprising sending, by the packet convergence entity, a retransmission request through one of the first RAT link or the second RAT link in response to determining that a data packet is missing from the second RAT link.

10. The method of claim 1, wherein the status report is sent periodically.

11. The method of claim 1, wherein the one or more events is receiving a status request from a transmitter.

12. An apparatus for aggregating data in wireless communications, the method comprising:
  means for communicating data packets, by a packet convergence entity, with a first radio access technology (RAT) link comprising a wireless wide area network (WWAN) link and a second RAT link comprising a wireless local area network (WLAN) link;
  means for receiving, at the packet convergence entity from each of the first RAT link and the second RAT link, an indication to enable the packet convergence entity to identify which of the first and second RAT links each of the data packets is received by the packet convergence entity;
  means for determining, at the packet convergence entity, which data packets are received from the first RAT link and the second RAT link based on the indications from the first RAT link and the second RAT link;
  means for monitoring, at the packet convergence entity, a sequence number value of each of the data packets received on the first RAT link and the second RAT link;
  means for determining, at the packet convergence entity, whether one or more data packets are missing based on the monitored sequence number values of the first RAT link and the second RAT link; and
  means for sending, by the packet convergence entity, a status report in response to one or more events on one or both of the first RAT link and the second RAT link.

13. A network device for aggregating data in wireless communications, comprising:
  a processor;
  a memory coupled with the processor, wherein the memory includes instructions being executable by the processor to:
  communicate data packets, by a packet convergence entity, with a first radio access technology (RAT) link comprising a wireless wide area network (WWAN) link and a second RAT link comprising a wireless local area network (WLAN) link;
  receiving, at the packet convergence entity from each of the first RAT link and the second RAT link, an indication to enable the packet convergence entity to identify which of the first and second RAT links each of the data packets is received by the packet convergence entity;
  determine, at the packet convergence entity, which data packets are received from the first RAT link and the second RAT link based on the indications from the first RAT link and the second RAT link;
  monitor, at the packet convergence entity, a sequence number value of each of the data packets received on the first RAT link and the second RAT link;
  determine, at the packet convergence entity, whether one or more data packets are missing based on the monitored sequence number values of the first RAT link and the second RAT link; and
  send, by the packet convergence entity, a status report in response to one or more events on one or both of the first RAT link and the second RAT link.

14. The network entity of claim 13, wherein the status report indicates which data packets have been received and which data packets are missing.

15. The network entity of claim 13, wherein the packet convergence entity comprises a packet data convergence protocol (PDCP) entity.

16. The network entity of claim 14, wherein:
  the WWAN link comprises a Long Term Evolution (LTE) link or a Universal Mobile Telecommunication System (UMTS) link, and
  the WLAN link comprises a Wi-Fi link.

17. The network entity of claim 13, wherein the one or more events is determining that a data packet is missing.

18. The network entity of claim 13, wherein determine whether one or more data packets are missing is based on a minimum sequence number value received on both the first RAT link and the second RAT link being greater than a largest sequence value of a received data packet when the first RAT link and second RAT link are configured to transmit data packets in ascending order of sequence number values.

19. The network entity of claim 13, wherein the data packets received on the first RAT link are based on the indications comprising a separate first sequence number values of in-order sequence number values and the data packets received on the second RAT are based on the indications comprising a separate second sequence number values of in-order sequence number values, wherein the first sequence number values and the second sequence number values are used to identify from which of the first RAT link and the second RAT link a data packet is received from.

20. The network entity of claim 13, wherein the instructions executable by the processor further send a retransmission request through the second RAT link in response to determining that a data packet is missing from the first RAT link.

21. The network entity of claim 13, wherein the instructions executable by the processor further send a retransmission request through one of the first RAT link or the second RAT link in response to determining that a data packet is missing from the second RAT link.

22. The network entity of claim 13, wherein the status report is sent periodically.

23. The network entity of claim 13, wherein the one or more events is receiving a status request from a transmitter.

24. A computer program product, comprising:
  a non-transitory computer-readable medium, comprising:
    code for communicating data packets, at a packet convergence entity, with a first radio access technology (RAT) link comprising a wireless wide area network (WWAN) link and a second RAT link comprising a wireless local area network (WLAN) link;
    code for receiving, at the packet convergence entity from each of the first RAT link and the second RAT link, an indication to enable the packet convergence entity to identify which of the first and second RAT links each of the data packets is received by the packet convergence entity;
    code for determining, at the packet convergence entity, which data packets are received from the first RAT link and the second RAT link based on the indications from the first RAT link and the second RAT link;

code for monitoring, at the packet convergence entity, a sequence number value of each of the data packets received on the first RAT link and the second RAT link;

code for determining, at the packet convergence entity, whether one or more data packets are missing based on the monitored sequence number values of the first RAT link and the second RAT link; and code for sending, by the packet convergence entity, a status report in response to one or more events on one or both of the first RAT link and the second RAT link.

25. The computer program product of claim 24, wherein the status report indicates which data packets have been received and which data packets are missing.

26. The computer program product of claim 24, wherein the packet convergence entity comprises a packet data convergence protocol (PDCP) entity.

27. The computer program product of claim 25, wherein:
the WWAN link comprises a Long Term Evolution (LTE) link or a Universal Mobile Telecommunication System (UMTS) link, and
the WLAN link comprises a Wi-Fi link.

28. The computer program product of claim 24, wherein the one or more events is determining that a data packet is missing.

29. The computer program product of claim 24, wherein determining whether one or more data packets are missing is based on a minimum sequence number value received on both the first RAT link and the second RAT link being greater than a largest sequence value of a received data packet when the first RAT link and second RAT link are configured to transmit data packets in ascending order of sequence number values.

30. The computer program product of claim 24, wherein the data packets received on the first RAT link are based on the indications comprising a separate first sequence number values of in-order sequence number values and the data packets received on the second RAT are based on the indications comprising a separate second sequence number values of in-order sequence number values, wherein the first sequence number values and the second sequence number values are used to identify from which of the first RAT link and the second RAT link a data packet is received from.

31. The computer program product of claim 24, further comprising code for sending, by the packet convergence entity, a retransmission request through the second RAT link in response to determining that a data packet is missing from the first RAT link.

32. The computer program product of claim 24, further comprising code for sending, by the packet convergence entity, a retransmission request through one of the first RAT link or the second RAT link in response to determining that a data packet is missing from the second RAT link.

33. The computer program product of claim 24, wherein the status report is sent periodically.

34. The computer program product of claim 24, wherein the one or more events is receiving a status request from a transmitter.

* * * * *